(12) United States Patent
Hamada

(10) Patent No.: US 9,927,264 B2
(45) Date of Patent: Mar. 27, 2018

(54) ENCODER AND SERVOMOTOR

(71) Applicant: Kabushiki Kaisha Yaskawa Denki, Kitakyushu-shi (JP)

(72) Inventor: Takehiko Hamada, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 587 days.

(21) Appl. No.: 14/585,817

(22) Filed: Dec. 30, 2014

(65) Prior Publication Data

US 2015/0108879 A1    Apr. 23, 2015

Related U.S. Application Data

(63) Continuation of application No. PCT/JP2012/067106, filed on Jul. 4, 2012.

(51) Int. Cl.
    *G01D 5/347* (2006.01)
    *H02K 11/00* (2016.01)
    *H02K 11/22* (2016.01)

(52) U.S. Cl.
    CPC ....... *G01D 5/34707* (2013.01); *G01D 5/3473* (2013.01); *G01D 5/34715* (2013.01); *G01D 5/34792* (2013.01); *H02K 11/22* (2016.01)

(58) Field of Classification Search
    CPC ............... G01D 5/347; G01D 5/34707; G01D 5/34715; G01D 5/3473; G01D 5/34776;
    (Continued)

(56) References Cited

U.S. PATENT DOCUMENTS 4,263,506 A * 4/1981 Epstein .............. G01D 5/34715
                                                    250/231.16
5,525,885 A *  6/1996 Sato ..................... G01D 5/2449
                                                    318/560
(Continued)

FOREIGN PATENT DOCUMENTS

JP    2002-039798 A    2/2002
JP    2008-082958 A    4/2008
(Continued)

OTHER PUBLICATIONS

International Preliminary Report on Patentability and Written Opinion dated Jan. 15, 2015 in PCT/JP2012/067106 (English Translation only).

(Continued)

*Primary Examiner* — John Lee
(74) *Attorney, Agent, or Firm* — Oblon, McClelland, Maier & Neustadt, L.L.P.

(57) ABSTRACT

An encoder includes a disc having one or more slit arrays having multiple slits aligned in a circumferential direction of the disc, and an optical module positioned to face a portion of the slit array such that the slit array moves relative to the optical module in the circumferential direction of the disc. The optical module includes two or four light sources aligned along a direction corresponding to the circumferential direction and one or more light receiving arrays aligned along the direction corresponding to the circumferential direction, the light sources are positioned to irradiate light upon a portion of the slit array, and the light receiving array includes multiple light receiving elements positioned to receive the light irradiated by the light sources and light affected by actions of the slits.

16 Claims, 14 Drawing Sheets

(58) Field of Classification Search
CPC ........... G01D 5/34784; G01D 5/34792; G05D 3/125; H02K 11/22
See application file for complete search history.

(56) References Cited

U.S. PATENT DOCUMENTS

| | | | |
|---|---|---|---|
| 6,459,389 B1 * | 10/2002 | Germuth-Loffler | B62D 15/02 250/231.18 |
| 2002/0020070 A1 | 2/2002 | Takeuchi | |
| 2009/0108188 A1 | 4/2009 | Urabe | |
| 2009/0321621 A1 * | 12/2009 | Yoshida | G01D 5/3473 250/231.13 |
| 2013/0229138 A1 | 9/2013 | Yoshida et al. | |
| 2014/0009043 A1 * | 1/2014 | Watanabe | G01B 7/30 310/68 B |
| 2015/0108879 A1 * | 4/2015 | Hamada | G01D 5/34715 310/68 B |

FOREIGN PATENT DOCUMENTS

| | | |
|---|---|---|
| JP | 2008-116343 A | 5/2008 |
| JP | 2010-096503 A | 4/2010 |
| JP | 2012-103032 A | 5/2012 |

OTHER PUBLICATIONS

International Search Report dated Oct. 2, 2012 in PCT/JP2012/067106 filed Jul. 4, 2012.

* cited by examiner

ENCODER AND SERVOMOTOR

CROSS-REFERENCE TO RELATED APPLICATION

The present application is a continuation of and claims the benefit of priority to International Application No. PCT/JP2012/067106, filed Jul. 4, 2012, the entire contents of which are incorporated herein by reference.

BACKGROUND

Technical Field

Embodiments of the disclosure relate to an encoder and a servomotor.

Description of Background Art

For example, there is an encoder that detects the absolute position of a motor.

SUMMARY

According to one aspect of the present disclosure, an encoder includes a disc which has one or more slit arrays having multiple slits aligned in a circumferential direction of the disc, and an optical module which is positioned to face a portion of the slit array or arrays such that the slit array or arrays move relative to the optical module in the circumferential direction of the disc. The optical module includes two or four light sources aligned along a direction corresponding to the circumferential direction and one or more light receiving arrays that is aligned along the direction corresponding to the circumferential direction and faces a part of the slit array on the same side as the light sources or on an opposite side to the light sources with respect to the slit array, the two or four light sources are positioned to irradiate light upon a portion of the slit array or arrays, and the light receiving array or arrays include multiple light receiving elements positioned to receive the light irradiated by the light sources and light affected by actions of the slits.

According to another aspect of the present disclosure, a servomotor includes a motor which has a shaft and rotates the shaft, and an encoder which includes a disc coupled to the shaft such that the encoder detects a position of the shaft. The disc has one or more slit arrays including multiple slits aligned in a circumferential direction of the disc, the encoder includes an optical module positioned to face a portion of the slit array or arrays such that the slit array or arrays move relative to the optical module in the circumferential direction of the disc, the optical module includes two or four light sources aligned along a direction corresponding to the circumferential direction and one or more light receiving arrays that are aligned along the direction corresponding to the circumferential direction and face a part of the slit array on the same side as the light sources or on an opposite side to the light sources with respect to the slit array, the two or four light sources are positioned to irradiate light upon a portion of the slit array or arrays, and the light receiving array or arrays include multiple light receiving elements positioned to receive the light irradiated by the light sources and light affected by actions of the slits.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
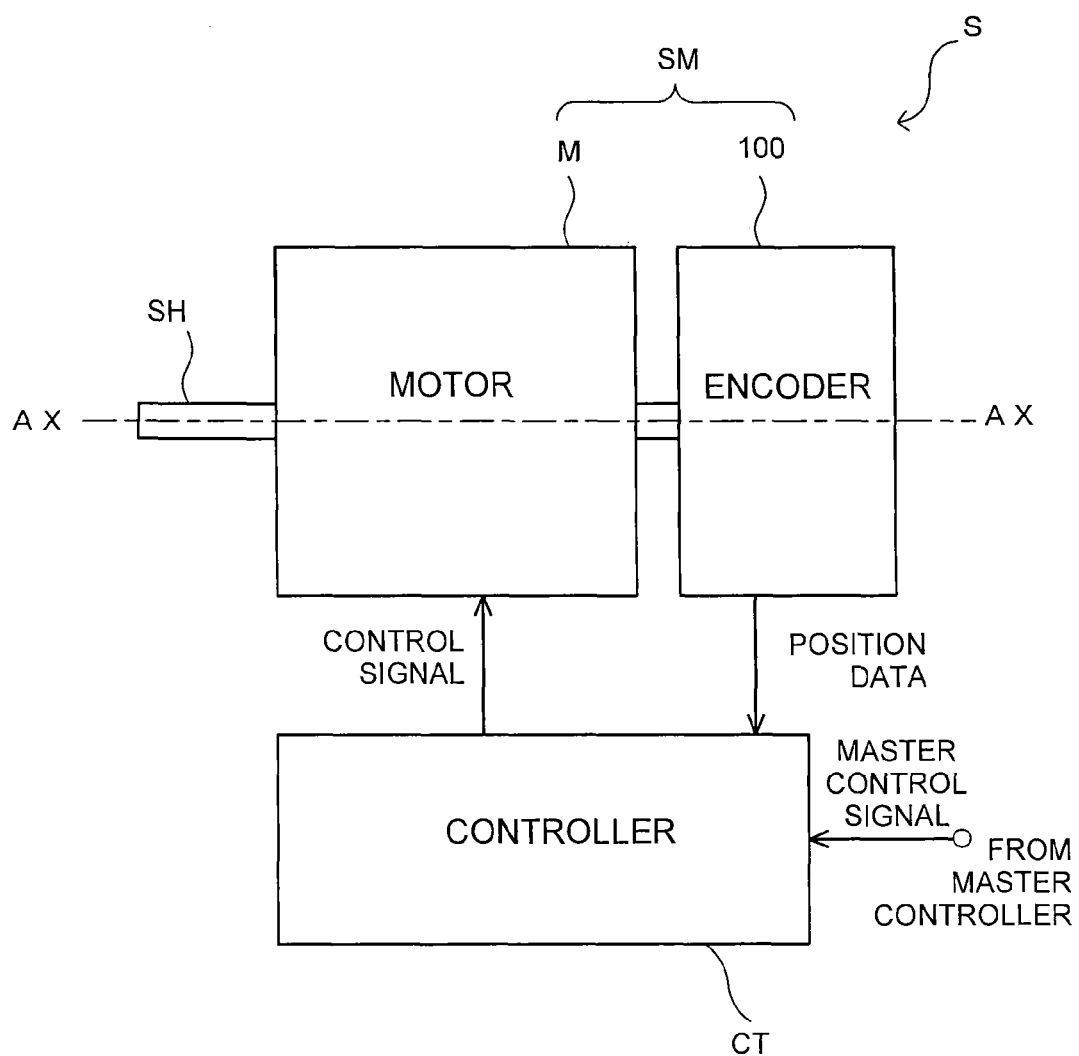
FIG. 1 is an illustrative diagram for illustrating a servosystem according to an embodiment.

The embodiments will now be described with reference to the accompanying drawings, wherein like reference numerals designate corresponding or identical elements throughout the various drawings.

An encoder described below and according to an embodiment can be applied to various types of encoders such as a rotary type and a linear type. However, for ease of understanding of the encoder according to the embodiment, a description will be given using a rotary type encoder as an example. When the encoder is applied to another type of encoder, since it is possible to achieve it by making an appropriate change such as the change of a moving member from the rotary type to the linear type, the detailed description thereof will be omitted below.

In the following description, "absolute" and "incremental" are described as necessary in short as "abso" and "incre".

Servosystem

The structure of a servosystem according to the present embodiment will first be described with reference to FIG. 1. As shown in FIG. 1, the servosystem (S) according to the present embodiment includes a servomotor (SM) and a controller (CT). The servomotor (SM) includes an encoder 100 and a motor (M).

The motor (M) is an example of a motive power generation source that does not include the encoder 100. Although the motor (M) itself may be referred to as a servomotor, the configuration including the encoder 100 is referred to as the servomotor (SM) in the present embodiment. The motor (M) includes a shaft (SH) that is an example of a moving member, and the shaft (SH) is rotated about an axis (AX) to output a rotation force.

The motor (M) is not particularly limited as long as the motor (M) is a motor that is controlled based on, for example, data such as position data detected by the encoder 100. The motor (M) is not limited to an electric motor using electricity as a motive power source, and may be a motor that uses another motive power source such as a hydraulic motor, a pneumatic motor or a steam jet motor. However, for ease of description, a case where the motor (M) is an electric motor will be described below.

The encoder 100 according to the present embodiment is coupled to the shaft (SH) on the opposite side to the rotation force output side of the motor (M). The encoder 100 detects the position (the angle) of the shaft (SH) to detect the position (x) (also referred to as a rotation angle (θ)) of the motor (M) (an example of a measurement target), and outputs position data indicating the position (x).

In addition to or instead of the position (x) of the motor (M), the encoder 100 may detect the speed (v) (also referred to as the rotation speed or the angular speed) of the motor (M) and/or the acceleration (a) (also referred to as the rotation acceleration or the angular acceleration) of the motor (M). In this case, the speed v and the acceleration (a) of the motor (M) can be detected by processing such as the first order or the second order differentiating of the position (x) with respect to time, or by the counting of a detection signal (for example, an incre-signal, which will be described later) during a desired time. For ease of description, in the following description, a physical amount detected by the encoder 100 is assumed to be the position (x).

The controller (CT) acquires the position data output from the encoder 100 and controls the rotation of the motor (M) based on the position data. Hence, in the present embodiment where an electric motor is used as the motor (M), the controller (CT) controls, based on the position data, a current, a voltage or the like applied to the motor (M), and thereby controls the rotation of the motor (M). Furthermore, the controller (CT) acquires a master control signal from a master controller (not shown), and thereby can control the motor (M) such that a rotation force capable of realizing the position or the like indicated by the master control signal is output from the shaft (SH) of the motor (M). In the case where the motor (M) uses another motive power source such as a hydraulic, a pneumatic or a steam jet type, the controller (CT) controls the feed of such a motive power source, and thereby can control the rotation of the motor (M).

Encoder

Figure 2:
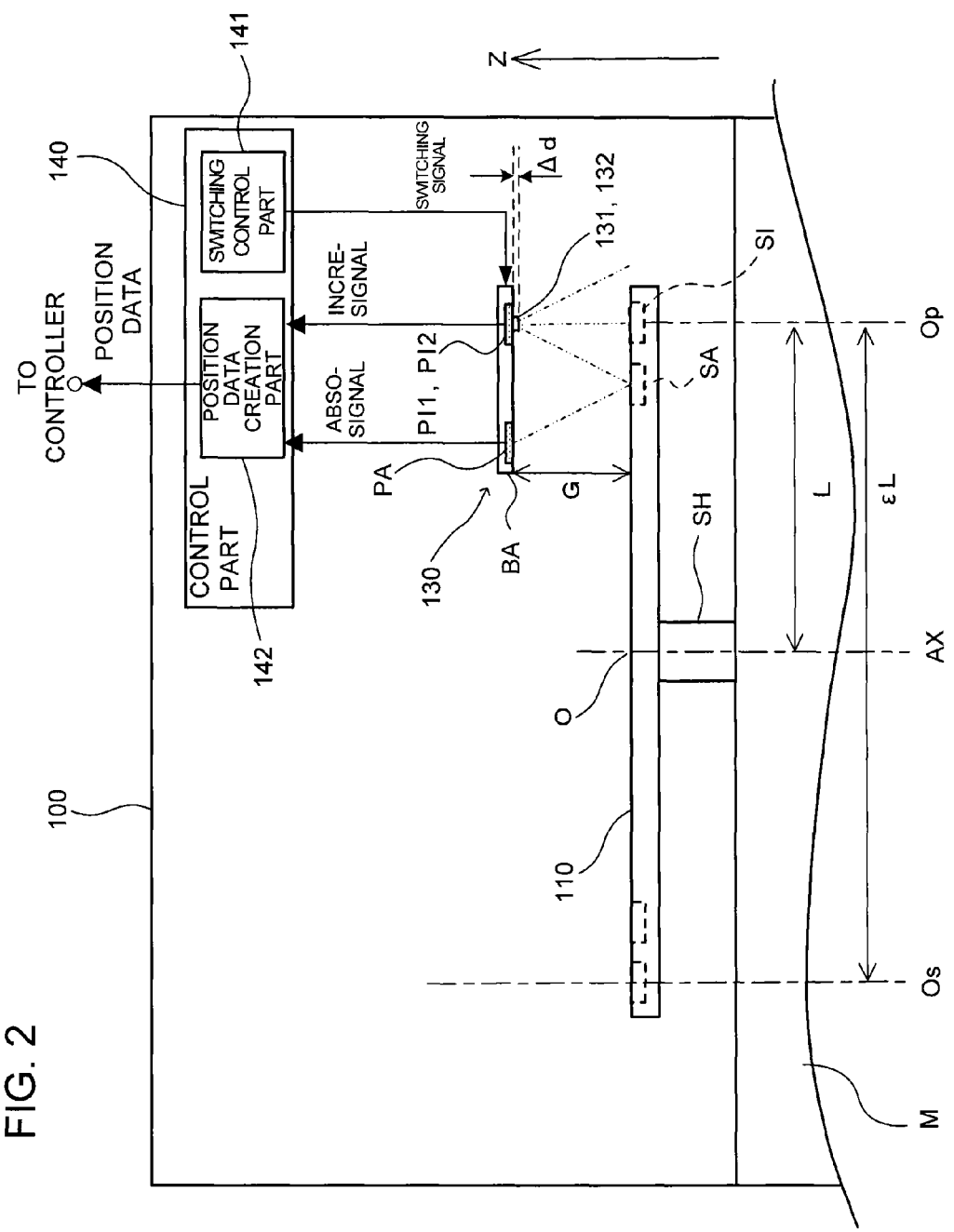
FIG. 2 is an illustrative diagram for illustrating an encoder according to the embodiment.

The encoder 100 according to the present embodiment will then be described with reference to FIGS. 2 to 6. As shown in FIG. 2, the encoder 100 according to the present embodiment includes a disc 110, an optical module 130 and a control part 140.

Here, for ease of the description of the structure of the encoder 100, in the present embodiment, directions such as upward and downward are defined as follows. Specifically, in FIG. 2, a direction in which the disc 110 faces the optical module 130, that is, the positive direction of a Z axis is referred to as "upward", and the opposite negative direction of the Z axis is referred to as "downward". However, the positional relationship of the individual configurations of the encoder 100 according to the embodiment is not particularly limited to the conception such as upward and downward. According to the ease of description, the directions defined here may be indicated by other expressions or directions other than these directions may be used while being described as necessary.

Disc

Figure 3:
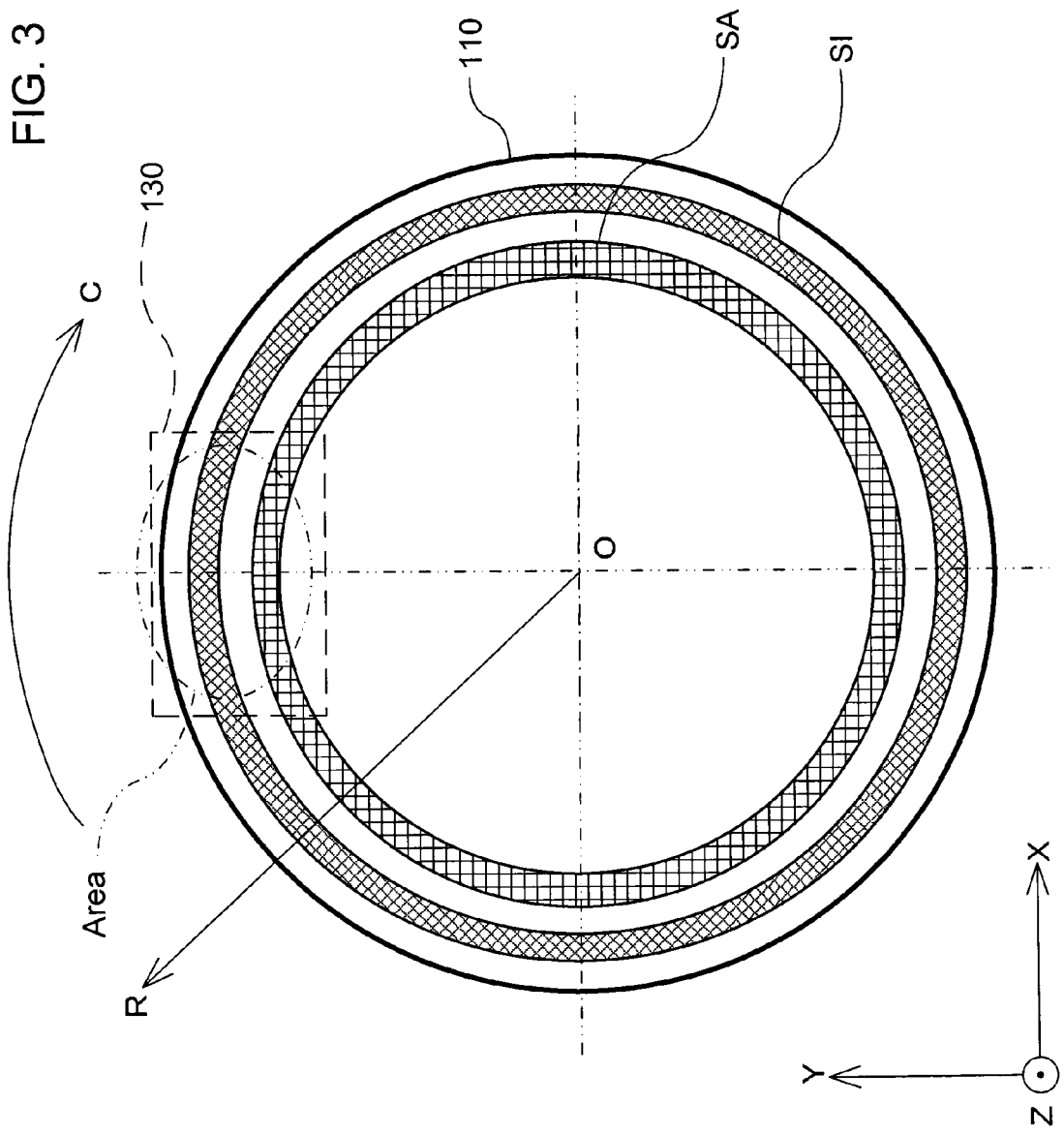
FIG. 3 is an illustrative diagram for illustrating a disc according to the embodiment.

The disc 110 is formed in the shape of a circular plate as shown in FIG. 3, and is arranged such that the disc center (O) substantially coincides with the axis (AX). Then, the disc 110 is coupled to the shaft (SH) of the motor (M) and is rotated by the rotation of the motor (M), that is, the rotation of the shaft (SH). In the present embodiment, although as an example of the measured target (also referred to as the moving member) measuring the rotation of the motor (M), a description will be given using example of the disc 110 formed in the shape of a circular plate, for example, it is possible to use, as the measured target, another member such as an end surface of the shaft (SH).

As shown in FIG. 3, the disc 110 includes multiple slit arrays (SA, SI). As described above, the disc 110 is rotated as the motor (M) is driven; on the other hand, the optical module 130 is fixedly arranged while facing part of the disc 110. Hence, the slit arrays (SA, SI) and the optical module 130 are arranged such that as the motor (M) is driven, they can be moved relatively to each other in a circumferential direction (which is a direction indicated by an arrow (C) shown in FIG. 3, and is referred to a "disc circumferential direction (C)" below as necessary) of the disc 110.

The optical module 130 is arranged to face parts of the slit arrays (SA, SI) on the upper surface side of the disc 110, and includes an optical detection mechanism. This optical detection mechanism will be described in detail.

Optical Detection Mechanism

The optical detection mechanism includes the slit arrays (SA, SI) and the optical module 130. The slit array is formed in the upper surface of the disc 110 as a track arranged about the disc center (O) in the shape of a ring. The slit array includes multiple reflective slits (obliquely hatched portion in FIG. 4) aligned along the disc circumferential direction (C). Each of the reflective slits reflects light irradiated from light sources (131, 132).

In the present embodiment, the disc 110 is formed of, for example, glass. The reflective slit of the slit array can be formed by coating the surface of the disc 110 of glass with a light reflective material. The material of the disc 110 is not limited to glass, and it is also possible to use metal, resin or the like. The reflective slit may be formed as follows: for example, a metal having a high reflectance is used as the disc 110, and a part which does not reflect light is formed to be a rough surface by spattering or the like or is coated with a material having a low reflectance to reduce the reflectance. However, the material of the disc 110, a method of manufacturing the disc 110 and the like are not particularly limited.

As the slit arrays, in the present embodiment, two slit arrays (the slit arrays (SA, SI)) are aligned next to each other in the radial direction (which is a direction indicated by an arrow (R) shown in FIG. 3, and is referred to a "disc radial direction (R)" below as necessary) of the disc 110 in the upper surface of the disc 110. In order for each of the two slit arrays (SA, SI) to be described in more detail, a partial enlarged diagram in the vicinity of an Area in FIG. 3 is shown in FIG. 4.

Figure 4:
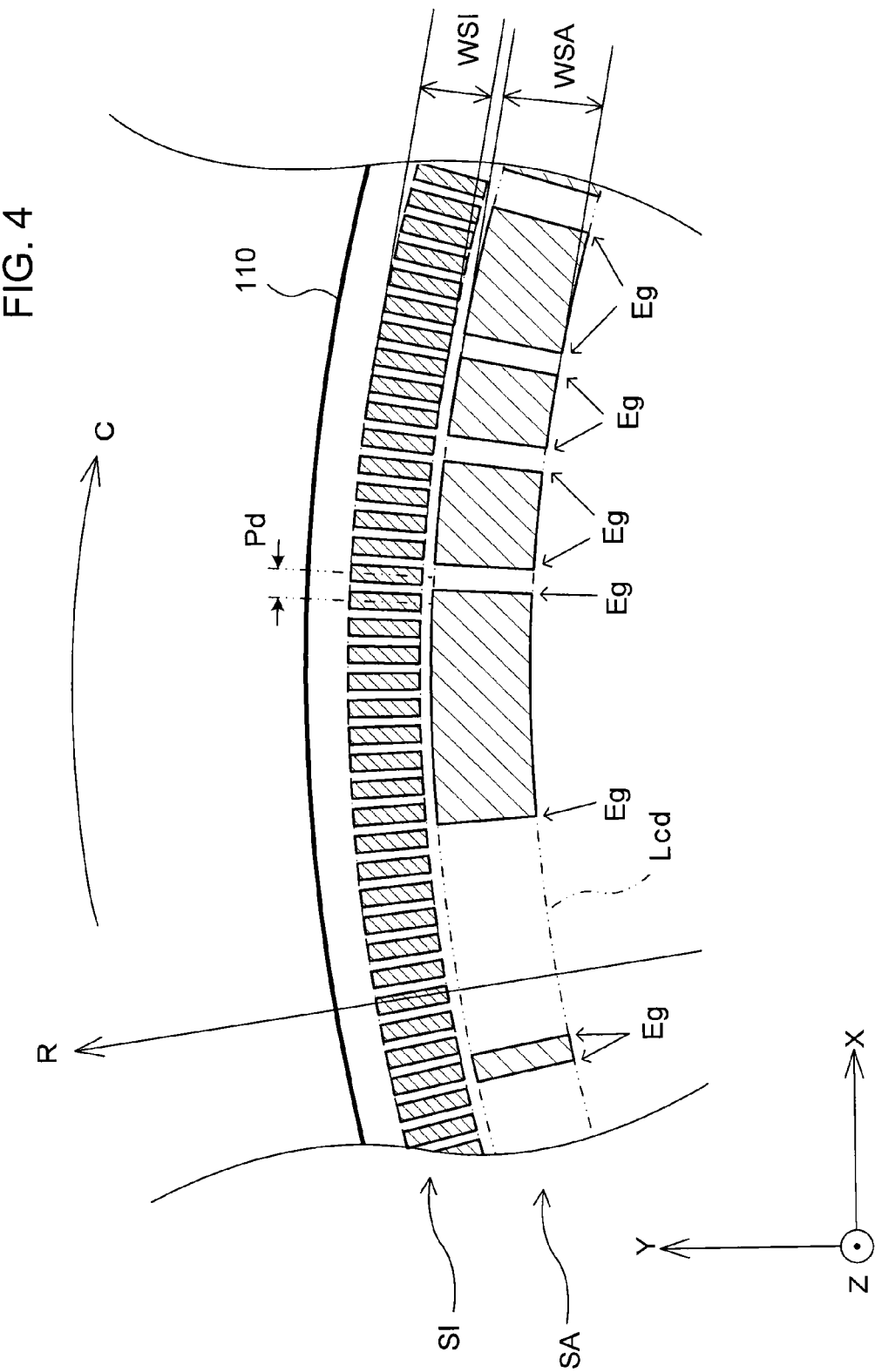
FIG. 4 is an illustrative diagram for illustrating a slit array according to the embodiment.

As shown in FIG. 4, the slit array (SA) (which corresponds to an example of a first slit array) is arranged on the side of an inside diameter in the two slit arrays, and the slit array (SI) (which corresponds to an example of a second slit array) is arranged on the side of an outside diameter. Multiple reflective slits included in the slit array (SA) are arranged in the entire circumference of the disc 110 so as to have an absolute pattern in the disc circumferential direction (C). In the reflective slits included in the slit array (SA), their end portions (Eg) in the disc circumferential direction (C) are formed to be arranged in areas where multiple reflective slits included in the slit array (SI) are not present in the disc circumferential direction (C) (substantially center area between the slits in the slit array (SI)).

The absolute pattern is a pattern in which the positions, the ratio and the like of the reflective slits within angles at which light receiving arrays included in the optical module 130 described later face each other are determined uniquely within one revolution of the disc 110. Specifically, when the motor (M) is present in the position (x), a combination (bit pattern of on/off in detection) of the detection or the non-detection of multiple light receiving elements of the light receiving arrays facing each other uniquely indicates the absolute value (absolute position) of the position (x). In a method of generating the absolute position, various algorithms can be used as long as they can generate a pattern that one-dimensionally indicates the absolute position of the motor (M) with the bits of the number of light receiving elements in the light receiving array.

When the absolute position is indicated by the absolute pattern as described above, and the light receiving elements of the light receiving array (PA) are located to face each other in the vicinity of the end portions (Eg) of the reflective slits, then the detection accuracy of the absolute position is lowered in the area where the bit pattern is changed by the detection or the non-detection of a light receiving signal. In order to prevent this, in the present embodiment, the two light sources (131, 132) are disposed in the optical module 130, and irradiation by the light sources is switched. The details thereof will be described later.

On the other hand, multiple reflective slits included in the slit array (SI) are arranged in the entire circumference of the disc 110 so as to have an increment pattern in the disc circumferential direction (C).

As shown in FIG. 4, the increment pattern is a pattern that is regularly repeated with a desired pitch. Unlike the absolute pattern that uses the detection or the non-detection by multiple light receiving elements as bits to indicate the position (x), this increment pattern uses the sum of detection signals by at least one or more light receiving elements to indicate the position of the motor (M) for each pitch or within one pitch. Hence, although the increment pattern does not indicate the absolute position (x) of the motor (M), as compared with the absolute pattern, it is possible to indicate the position highly accurately.

As shown in FIGS. 2 and 3, the optical module 130 is formed as a substrate (BA) that is parallel to the disc 110, and is fixed so as to face parts of the slit arrays (SA, SI) of the disc 110. Hence, as the disc 110 is rotated, the optical module can be moved in the disc circumferential direction (C) relatively to the slit arrays (SA, SI). Although in the present embodiment, a description is given of a case where the optical module 130 is formed as the substrate (BA) capable of reducing the thickness of the encoder 100 and facilitating the manufacturing thereof, the optical module 130 does not always need to be included in the shape of a substrate.

Figure 5:
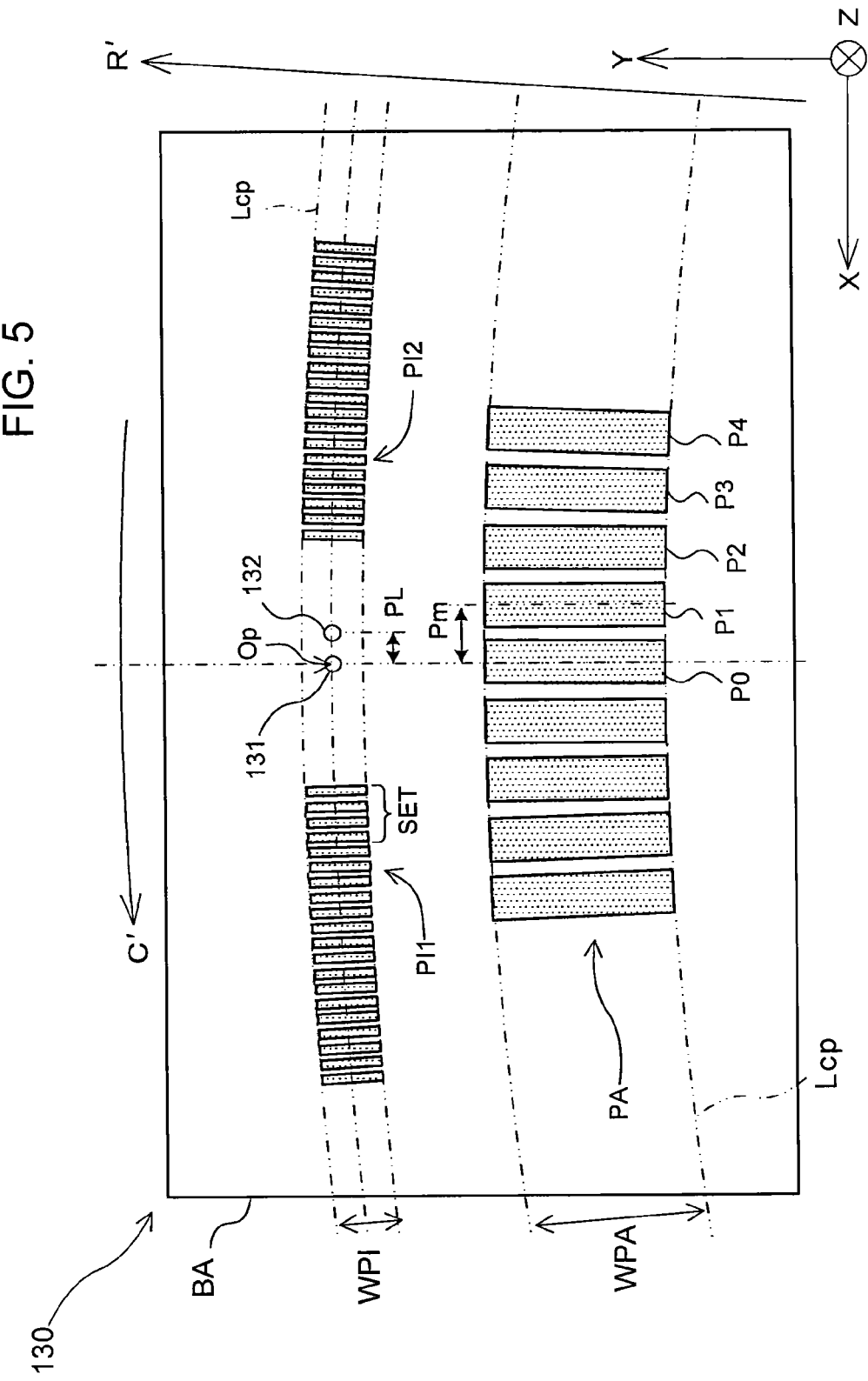
FIG. 5 is an illustrative diagram for illustrating an optical module and a light receiving array according to the embodiment.

On the other hand, as shown in FIGS. 2 and 5, the optical module 130 has the two light sources (131, 132) and the light receiving arrays (PA, PI1, PI2) on the surface of the substrate (BA) facing the disc 110. The light sources (131, 132) respectively link to means for irradiating a part of the slit array with light. The light receiving arrays (PA, PI1, PI2) link to means for facing a part of the slit array, described in claims.

The light sources (131, 132) are arranged, on the lower surface (surface in the negative direction of the Z axis) of the substrate (BA), that is, on the surface in the direction facing the slit array, along the direction (which is a direction indicated by an arrow (C') shown in FIG. 5, and is referred to a "module circumferential direction (C')" below as necessary) corresponding to the disc circumferential direction (C). The light sources (131, 132) irradiate, with light, a part (for example, Area, and also referred to as an "irradiation area") of the two slit arrays (SA, SI) passing through the positions facing each other. Although details will be described later, irradiation by the light source 131 and irradiation by the light source 132 are switched and performed, and are not performed simultaneously. The light source 131 corresponds to one example of one light source, and the light source 132 corresponds to one example of the other light source.

These light sources (131, 132) are not particularly limited as long as they are light sources capable of irradiating the irradiation area with light, and for example, an LED (Light Emitting Diode) can be used. The light sources (131, 132) are formed as point light sources where an optical lens and the like in particular are not arranged, and irradiate with diffusion light from a light emitting part. It is needless to say that in the case of the point light source, the point light source does not need to satisfy strict point, and as long as the light source can be regarded to emit diffusion light from a position substantially in the shape of a point in terms of design and operating principle, light may be emitted from a finite surface. The light source described above is used, and thus the light sources (131, 132) can irradiate, with diffusion light, parts of the two slit arrays (SA, SI) passing through the positions facing each other though effects such as attenuation caused by variations in the amount of light due to displacement from the optical axis and the difference of optical path lengths are slightly produced. As a result, it is possible to substantially uniformly irradiate these parts with light. Since light collection/diffusion by an optical element is not performed, an error or the like caused by an optical element is unlikely to occur, and thus it is possible to enhance the linearity of the light irradiated to the slit array.

The light receiving array is arranged around the light source 131 on the surface of the substrate (BA) in the direction facing the slit array, and receives light reflected off the slit array facing it. Hence, the light receiving array includes multiple light receiving elements (dot-hatching part, such as the light receiving elements (P0 to P4)). As shown in FIG. 5, multiple light receiving elements forming the light receiving array are aligned along the module circumferential direction (C').

The module circumferential direction (C') in the optical module 130 forms a shape to which the disc circumferential direction (C) in the disc 110 is projected by the optical module 130. Specifically, the light receiving array receives light that is irradiated from the light sources (131, 132) and that is reflected off the slit array of the disc 110, and the light irradiated from the light sources (131, 132) is diffusion light. Hence, an image of the slit array projected on the optical module 130 is enlarged by a desired enlargement factor $\epsilon$ corresponding to the optical path length. In other words, as shown in FIGS. 4 and 5, when it is assumed that the lengths of the slit arrays (SA, SI) in the disc radial direction (R) are WSA and WSI, respectively, and that the lengths of the shapes to which their reflected light is projected on the optical module 130 in the direction (which is a direction indicated by an arrow (R') shown in FIG. 5, and is referred to a "module radial direction (R')" below as necessary) corresponding to the disc radial direction (R) are WPA and WPI, respectively, WPA and WPI are $\epsilon$ times as long as WSA and WSI. Likewise, the module circumferential direction (C') is also projected on the optical module 130, and is formed in a shape affected by the enlargement factor ($\epsilon$). For ease of understanding, a more specific description will be given using, as an example, the module circumferential direction (C') in the positions of the light sources (131, 132). The disc circumferential direction (C) in the disc 110 is circular about the axis (AX). By contrast, since light from the light sources (131, 132) is irradiated, with reference to the light source center (Op) that is a position within the surface of the disc 110 on which the light sources (131, 132) are arranged, apparently, the center of the module circumferential direction (C') projected on the optical module 130 is located apart from the above reference by a distance (EL) obtained by enlarging a distance (L) between the axis (AX) and the optical center (Op) by the enlargement factor $\epsilon$. In FIG. 2, this position is conceptually shown as a measurement axis center (Os). Hence, the module circumferential direction (C') in the optical module 130 is: on a line which is from the optical center (Op) and on which the optical center (Op) and the axis (AX) are put; and on the line having a radius of the distance ($\epsilon$L) and the measurement axis center (Os) as a center which is apart by the distance ($\epsilon$L) in the direction of the axis (AX).

In FIGS. 4 and 5, the correlation between the disc circumferential direction (C) and the module circumferential direction (C') is indicated by arc-shaped lines (Lcd, Lcp). The line (Lcd) shown in FIG. 4 represents a line along the disc circumferential direction (C) on the disc 110 whereas the line (Lcp) shown in FIG. 5 represents a line (the line obtained by reflecting the line (Lcd) on the optical module 130) along the module circumferential direction (C') on the substrate (BA).

When it is assumed that, as shown in FIG. 2, the gap length between the optical module 130 and the disc 110 is G, and the amount of protrusion of the light sources (131, 132) from the substrate (BA) is $\Delta d$, the enlargement factor E is expressed by the following Formula 1.

$$\epsilon = (2G - \Delta d)/(G - \Delta d). \qquad \text{Formula 1}$$

As each of the light receiving elements, for example, a PD (Photodiode) can be used. However, the light receiving element is not limited to the PD, and as long as the light receiving element can receive the light emitted from the light sources (131, 132) and can convert it into electric signals, there is no particular restriction.

With respect to the light receiving array in the present embodiment, about two light receiving arrays (light receiving arrays (PA, PI1, PI2)) are arranged so as to correspond to the two slit arrays (SA, SI). The slit array (SA) corresponds to the light receiving array (PA), and the slit array (SI) corresponds to the light receiving arrays (PI1, PI2). Although the light receiving arrays (PI1, PI2) are divided halfway, since they are arranged on the same track (that is, on the same circumference), they are regarded as one herein. The number of light receiving arrays that correspond to one slit array is not limited to one, and multiple light receiving arrays may be arranged.

In the present embodiment, the light sources (131, 132), the light receiving array (PA) for an abso-signal and the light receiving arrays (PI1, PI2) for an incre-signal are arranged in a positional relationship shown in FIG. 5.

The light receiving array (PA) for the abso-signal (which corresponds to one example of a first light receiving array) is arranged, as shown in FIG. 5, in a position offset to the side of the inside diameter (which may be the side of the outside diameter) with respect to the light sources (131, 132) in the module radial direction (R') within the surface of the substrate (BA) parallel to the slit array (SA). Multiple light receiving elements included in the light receiving array (PA) are aligned with a desired pitch along the module circumferential direction (C') (more accurately, the line (Lcp)). Hence, each of light receiving element groups in the light receiving array (PA) receives reflected light from the slit array (SA), and thereby generates the abso-signal having a bit pattern of the number of light receiving elements. On the other hand, the light receiving arrays (PI1, PI2) for the incre-signal are arranged, as shown in FIG. 5, both on one side and on the other side of the light sources (131, 132) in the module circumferential direction (C') within the surface of the substrate (BA) parallel to the slit array (SI). In other words, the light sources (131, 132) are arranged in positions in the light receiving arrays (PI1, PI2) for the increment signal arranged as one track in the module circumferential direction (C').

In the present embodiment, the light receiving array (PA) corresponding to the absolute pattern includes, for example, 9 light receiving elements. As described above, in light receiving elements, each of light reception or non-light reception is treated as a bit, and the absolute position (x) of 9 bits is indicated. Hence, the light receiving signals received by light receiving elements are treated in a position data creation part 142 of the control part 140 independently of each other, and the absolute position (x) encrypted (coded) in a serial bit pattern is decoded from a combination of these light receiving signals. This light receiving signal of the light receiving array (PA) is referred to as an "absolute signal" or an "abso-signal" in short.

The light receiving arrays (PI1, PI2) (which correspond to an example of a second light receiving array) corresponding to an incremental pattern includes multiple light receiving elements arranged on the line (Lcp) corresponding to the same slit array (SI). This light receiving array will first be described using the light receiving array (PI1) as an example.

In the present embodiment, in one pitch (one pitch in a projected image; the same as a pitch (Pm) shown in FIG. 5) in the incremental pattern, sets (SETs) of a total of four light receiving elements are aligned, and sets of four light receiving elements are further aligned along the module circumferential direction (C'). Then, since in the incremental pattern, the reflective slit is repeatedly formed for each pitch, when the disc 110 is rotated, each light receiving element generates a periodic signal in which one pitch is one period (an electrical angle of 360°). Then, since in one set corresponding to one pitch, four light receiving elements are arranged, light receiving elements adjacent to each other within one set individually detect a periodic signal having a phase difference of 90°. These light receiving elements are referred to as an A phase signal, a B phase signal (having a phase difference of 90° with the A phase signal), an A bar phase signal (having a phase difference of 180° with the A phase signal) and a B bar phase signal (having a phase difference of 180° with the B phase signal).

Since the incremental pattern indicates the position in one pitch, the signal of each phase in one set and the signal of each phase in the other set corresponding thereto are values that vary in the same manner. Hence, the signals of the same phase are added in multiple sets. Hence, four signals whose phases are individually displaced 90° are detected from a large number of light receiving array (PI1) shown in FIG. 5. On the other hand, the light receiving array (PI2) is also included in the same manner as the light receiving array (PI1). Hence, four signals whose phases are individually displaced 90° are generated from the light receiving arrays (PI1, PI2). These four signals are referred to as "incremental signals" or "incre-signals" in short. The light receiving arrays (PI1, PI2) correspond to an example of the second light receiving array.

In the present embodiment, the case where one set corresponding to one pitch of the incremental pattern includes four light receiving elements and each of the light receiving array (PI1) and the light receiving array (PI2) has the same sets are described. However, the number of light receiving elements in one set is not particularly limited, and the light receiving array (PI1) and the light receiving array (PI2) may be included so as to acquire light receiving signals of different phases.

As shown in FIG. 5, the light source 131 of the two light sources (131, 132) is arranged in the module circumferential direction (C') in the position substantially coinciding with the center position (in this example, the center position of the light receiving element P0) of the light receiving array (PA). The light source 132 is aligned with the light source 131 along the module circumferential direction (C'). In the following description, as necessary, the light source 131 is referred to as a "first light source 131", and the light source 132 is referred to as a "second light source 132". The first light source 131 and the second light source 132 are arranged to be displaced by a pitch (PL) in the module circumferential direction (C'). When the pitch of the individual light receiving elements in the light receiving array (PA) in the module circumferential direction (C') is assumed to be Pm (which corresponds to an example of the pitch (P)), the pitch (PL) is expressed by the following formula (Formula 2) using the gap length (G) and the amount of protrusion (Δd).

$$PL=Pm/2\times(g-\Delta d)/G \quad \text{Formula 2}$$

The pitch (Pm) of the individual light receiving elements in the light receiving array (PA) is substantially equal to one pitch in the image on which the incremental pattern of the slit array (SI) is projected, and can be expressed as Pm=ϵ×Pd using one pitch (Pd) (see FIG. 4) of the incremental pattern of the slit array (SI) in the disc 110 and the enlargement factor ϵ described above. When the amount of protrusion (Δd) is sufficiently less than the gap length (G), as is understood from the above (Formula 2), the pitch (PL) is substantially equal to a half pitch (Pm/2). For ease of description, a description is given below with assumption that the pitch (PL) is the half pitch (Pm/2) so as to correspond to this case.

Since, as described above, the two light sources (131, 132) are aligned to be displaced in the module circumferential direction (C') by the half pitch (Pm/2), it is possible to dispose a phase difference between the abso-signal (which corresponds to one example of the first light receiving signal) of the light receiving array (PA) by light from the first light source 131 and the abso-signal (which corresponds to one example of the second light receiving signal) of the light receiving array (PA) by light from the second light source 132. In this example, the phase difference corresponds to the half pitch of the incremental pattern, and is thereby an electrical angle of 180°.

Then, as described above, in each of the reflective slits included in the slit array (SA), its end portion (Eg) is located in an area between the slits of the slit array (SI). In other words, in an area where each of the reflective slits in the slit array (SI) is present, each of the light receiving elements in the light receiving array (PA) is not located to face the edge portion (Eg) of the reflective slit. Hence, when the position in one pitch by the incre-signal from the light receiving arrays (PI1, PI2) is the area where the reflective slit is present, the absolute position by the abso-signal from the light receiving array (PA) does not correspond to the area where the bit pattern is changed. On the other hand, when the position in one pitch is the area where the reflective slit is not present, the absolute position by the abso-signal from the light receiving array (PA) may correspond to the area where the bit pattern is changed.

Hence, in the present embodiment, when the position in one pitch by the incre-signal from the light receiving arrays (PI1, PI2) at the time of the irradiation of the first light source 131 corresponds to the area where the reflective slit is not present, the irradiation is switched to the irradiation of the second light source 132. As a result, since the incre-signal from the light receiving arrays (PI1, PI2) is a substantially sinusoidal periodic signal where one pitch is one period (an electrical angle of 360°), the incre-signal is made to differ by a phase of 0.5 period (an electrical angle of 180°) corresponding to the half pitch, and thus the position in one pitch is changed to the area where the reflective slit is present. Consequently, even when the absolute position by the abso-signal from the light receiving array (PA) at the time of the irradiation of the first light source 131 corresponds to the area where the bit pattern is changed, the abso-signal from the light receiving array (PA) at the time of the irradiation of the second light source 132 is used, with the result that it is possible to prevent the absolute position by the abso-signal from corresponding to the area where the bit pattern is changed and thereby enhance the detection accuracy of the absolute position.

The acquisition of the above effect is not limited to the case where the phase difference of the individual abso-signals at the time of the irradiation of the first light source 131 or the second light source 132 is an electrical angle of 180° corresponding to the half pitch of the incremental pattern. For example, the phase difference may be an odd multiple of 0.5 pitch such as 1.5 pitch (an electrical angle of 540°) or 2.5 pitch (an electrical angle of 900°). Furthermore, it is not always necessary to set an odd multiple of the half pitch, and as long as the position in one pitch can be changed from the area where the reflective slit is not present to the area where the reflective slit is present, the phase difference may be increased or decreased. However, with consideration given to the fact that the Mere-signal from the light receiving arrays (PI1, PI2) is a substantially sinusoidal periodic signal where one pitch is one period (an electrical angle of 360°), the phase difference is set at an odd multiple of 0.5 pitch, and thus it is possible to increase the certainty that the position in one pitch can be changed from the area where the reflective slit is not present to the area where the reflective slit is present. Hence, it can be said that when a natural number including 0 is assumed to be n, the two light sources (131, 132) are preferably arranged to be displaced by (n+0.5) Pm in the module circumferential direction (C'). When it cannot be said that the amount of protrusion (Δd) is sufficiently less than the gap length (G), the two light sources (131, 132) are preferably arranged to be displaced by {(n+0.5) Pm×(G−Δd)/G}. When the distance between the two light sources (131, 132) is increased, the amount of light received by the light receiving arrays (PI1, PI2) and the light receiving array (PA) at the time of the irradiation of the second light source 132 is not uniform in the module circumferential direction (C'), and the characteristic on the distribution of the amount of light is lowered. Hence, it can be said that the two light sources (131, 132) are most preferably arranged to be displaced by the least value that satisfies (n+0.5) Pm, that is, the half pitch (Pm/2) as in the present embodiment.

Control Part

As shown in FIG. 2, the control part 140 includes a switching control part 141 and the position data creation part 142. The switching control part 141 controls the switching between the irradiation of the first light source 131 and the irradiation of the second light source 132. Based on the incre-signal from the light receiving arrays (PI1, PI2) at the time of the irradiation of the first light source 131, the switching control part 141 determines whether or not the irradiation of the first light source 131 is to be switched to the irradiation of the second light source 132.

The details of the determination will be described. The switching control part 141 first irradiates the first light source 131 at the timing at which the position (x) of the motor (M) is measured (for example, when the power supply of the encoder 100 is turned on). The position data creation part 142 acquires the individual light receiving signals (the A phase signal, the B phase signal, the A bar phase signal and the B bar phase signal) from the sets of the four light receiving elements included in the light receiving arrays (PI1, PI2) at that time. The switching control part 141 acquires, among those light receiving signals, a specific signal (for example, the B phase signal) from the position data creation part 142, and, for example, when an output amplitude is higher than a desired threshold value (in the following description, it is said that the signal is "H"), the position in one pitch of the disc 110 is regarded as the area where the reflective slit of the slit array (SI) is present, and it is determined that the light source does not need to be switched. In this case, since the switching control part 141 does not switch the light source, the position data creation part 142 detects the absolute position based on the abso-signal from the light receiving array (PA) by the irradiation of the first light source 131 and likewise detects a relative position from the absolute position based on the incre-signal from the light receiving arrays (PI1, PI2) by the irradiation of the first light source 131.

On the other hand, when the output amplitude of a specific signal (for example, the B phase signal) acquired from the position data creation part 142 at the time of the irradiation of the first light source 131 is less than a desired threshold value (in the following description, it is said that the signal is "L"), the switching control part 141 regards the position in one pitch of the disc 110 as the area where the reflective slit of the slit array (SI) is not present, and determines that the light source needs to be switched. In this case, the switching control part 141 switches the irradiation of the first light source 131 to the irradiation of the second light source 132, and the position data creation part 142 detects the absolute position based on the abso-signal from the light receiving array (PA) at that time. Thereafter, the switching control part 141 switches again the irradiation of the second light source 132 to the irradiation of the first light source 131, and the position data creation part 142 detects the relative position based on the incre-signal from the light receiving arrays (PI1, PI2) at that time. The reason why the irradiation is returned to the irradiation by the first light source 131 when the incre-signal is acquired is that the light receiving arrays (PI1, PI2) of the optical module 130 are formed such that they can detect the proper position by the irradiation by the first light source 131 present in the intermediate position, and that the detection position is displaced by a half pitch (Pd/2), by the irradiation through the second light source 132 arranged to be displaced by the half pitch (Pm/2).

The position data creation part 142 acquires, from the optical module 130, the abso-signal of the bit pattern indicating the absolute position (x) and the four incre-signals whose phases are individually displaced by 90°. Then, the position data creation part 142 calculates, based on the acquired signals, the position (x) of the motor (M) indicated by these signals, and outputs the position data indicating the position x to the controller (CT).

Since various methods can be used as a method of generating the position data by the position data creation part 142, it is not particularly limited. Although here, the absolute position is detected based on the abso-signal, and the relative position from the absolute position is detected based on the incre-signal, for example, both the incre-signal and the abso-signal may be used to detect a more highly accurate absolute position.

Control by Control Part

Details of control by the control part 140 included in the encoder 100 according to the present embodiment will then be described with reference to FIG. 6. The control part 140 starts a step shown in the flowchart of FIG. 6 at the timing at which the position (x) of the motor (M) is measured (for example, when the power supply of the encoder 100 is turned on).

First, in step S10, the control part 140 supplies, with the switching control part 141, a current to the first light source 131, and irradiates the first light source 131. As a result, the light from the first light source 131 is irradiated to the slit arrays (SA, SI), and the reflected light from the slit arrays (SA, SI) is received by the individual light receiving elements of the light receiving arrays (PA, PI1, PI2).

Then, in step S20, the control part 140 acquires, with the position data creation part 142, the individual light receiving signals (the A phase signal, the B phase signal, the A bar phase signal and the B bar phase signal) from the set of the four light receiving elements included in the light receiving arrays (PI1, PI2). Then, a specific signal (for example, the B phase signal) among these light receiving signals is acquired by the switching control part 141.

Then, in step S30, the control part 140 determines, with the switching control part 141, whether or not the signal acquired in step S20 described above is "H". When it is determined that the signal is "H" (YES in step S30), the process proceeds to step S40.

In step S40, the control part 140 acquires, with the position data creation part 142, the abso-signal from the light receiving array (PA) by the irradiation of the first light source 131. Thereafter, the process proceeds to step S80, which will be described later.

On the other hand, when in step S30 described above, it is determined that the signal is "L" (NO in step S30), the process proceeds to step S50.

In step S50, the control part 140 stops, with the switching control part 141, the feed of a current to the first light source 131 and turns it off, and supplies a current to the second light source 132 to irradiate the second light source 132. As a result, the irradiation by the first light source 131 is switched to the irradiation by the second light source 132.

Then, in step S60, the control part 140 acquires, with the position data creation part 142, the abso-signal from the light receiving array (PA) by the irradiation of the second light source 132.

Then, in step S70, the control part 140 stops, with the switching control part 141, the feed of a current to the second light source 132 and turns it off, and supplies a current to the first light source 131 to irradiate the first light source 131. As a result, the irradiation by the second light source 132 is switched again to the irradiation by the first light source 131.

Then, in step S80, the control part 140 acquires, with the position data creation part 142, the incre-signal from the light receiving arrays (PI1, PI2) by the irradiation of the first light source 131.

Then, in step S90, the control part 140 calculates, with the position data creation part 142, based on the abso-signal and the incre-signal acquired in step S40 or step S60 and step S80 described above, the position (x) of the motor (M) indicated by these signals, and outputs the position data indicating the position x to the controller (CT). Then, this flow is completed.

Effects of the Present Embodiment

When, as in the embodiment described above, as the slit array, the slit array having the absolute position indicating the absolute position is used, in the area where the bit pattern by the detection or the non-detection of the light receiving signal is changed, the detection accuracy of the absolute position is disadvantageously lowered.

Hence, in the configuration of the present embodiment, the optical module 130 includes the two light sources (131, 132), and the two light sources (131, 132) are aligned in the module circumferential direction (C'). As a result, between the abso-signal of the light receiving array (PA) by the light from the first light source 131 and the abso-signal of the light receiving array (PA) by the light from the second light source 132, the phase difference can be disposed. When in the configuration described above, the absolute position based on the abso-signal by the light from the first light source 131 corresponds to the area where the bit pattern is changed, it is possible to calculate the absolute position using the abso-signal by the light from the second light source 132 and vice versa, with the result that it is possible to enhance the detection accuracy of the absolute position.

Figure 7:
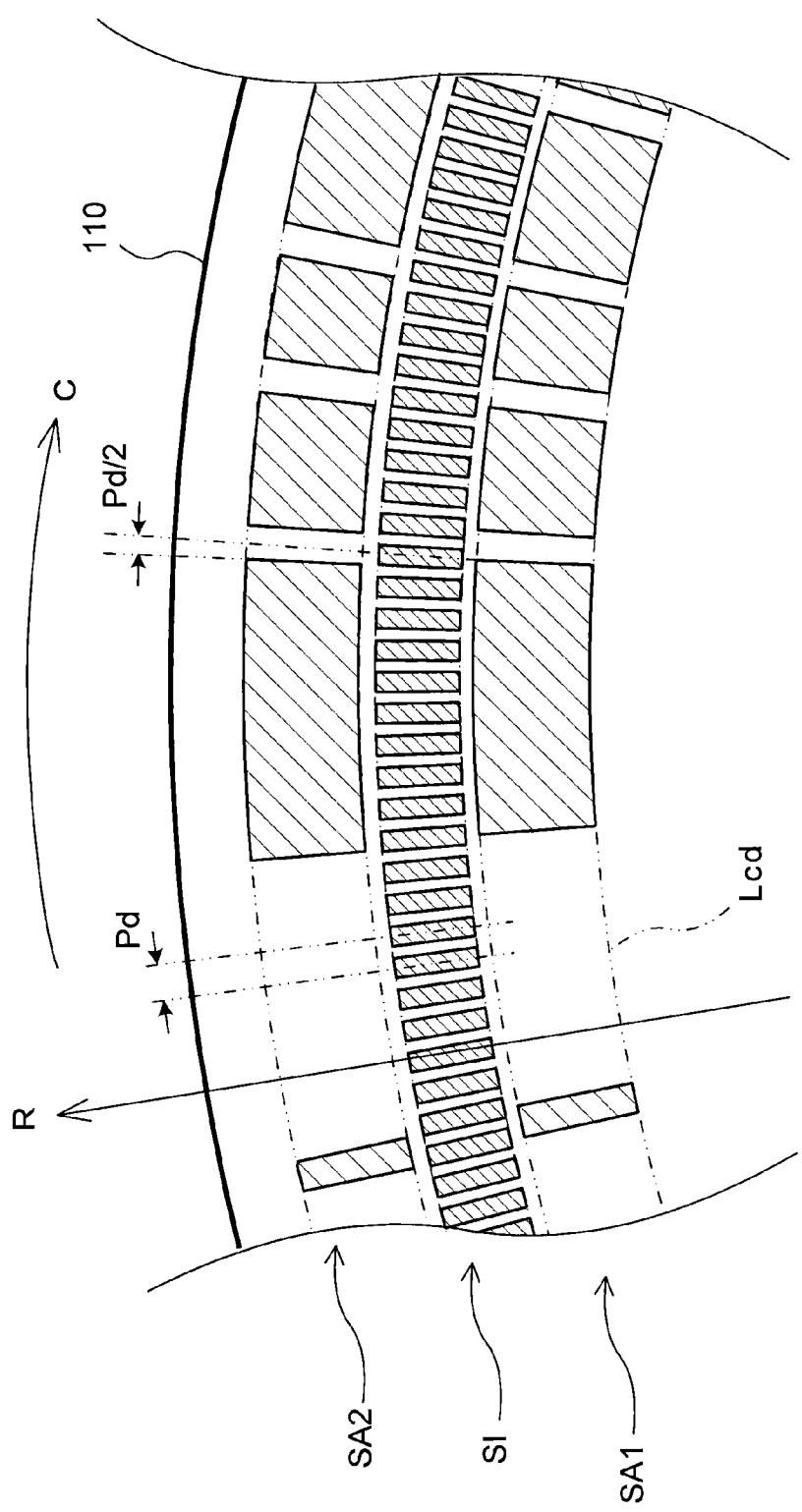
FIG. 7 is an illustrative diagram for illustrating a slit array according to a comparative example.
Figure 8:
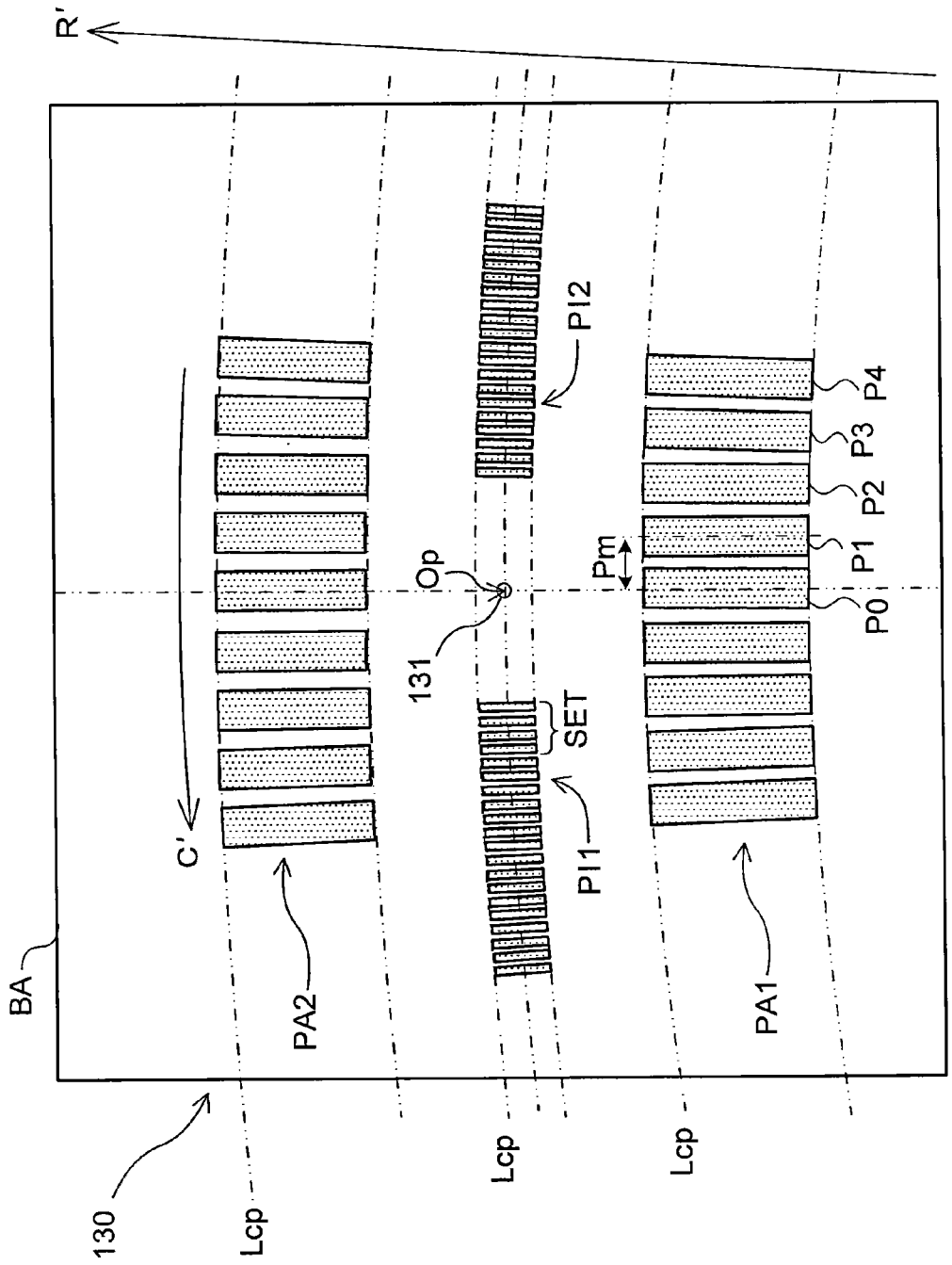
FIG. 8 is an illustrative diagram for illustrating an optical module and a light receiving array according to the comparative example.

In order for the same effects to be obtained, it can be considered that for example, as in a comparative example shown in FIGS. 7 and 8, one light source is used, and two slit arrays (SA1, SA2) offset by a desired length in the disc circumferential direction (C) on the disc 110 (for example, ½ of one pitch (Pd) in the incremental pattern) are formed, or though not shown in the figures, the slit arrays (SA1, SA2) are not offset, light receiving arrays (PA1, PA2) respectively corresponding to the two slit arrays (SA1, SA2) are offset and light receiving signals of different phases are obtained. In this case, since the two slit arrays (SA1, SA2) are formed in the disc and the two corresponding light receiving arrays (PA1, PA2) are disposed in the optical module 130, the size of the encoder 100 is increased. By contrast, since in the present embodiment, the two light sources are only disposed, and one slit array (SA) and one light receiving array (PA) are included, as compared with the configuration described above, the sizes of the disc 110 and the optical module 130 (in particular, the dimensions in the module radial direction (R')) can be significantly reduced. Furthermore, although in the comparative example, processing circuit such as a comparator for the abso-signal is necessary for each of the light receiving arrays (PA1, PA2), in the present embodiment, the processing circuit is disposed only in the light receiving array (PA). Hence, it is possible to reduce the size while enhancing the detection accuracy of the encoder 100 and furthermore to reduce the number of components to decrease the manufacturing cost.

In the present embodiment, in particular, the first light source 131 is arranged in the position where in the module circumferential direction (C'), the center position of the light receiving array (PA) substantially coincides with the intermediate position of the light receiving arrays (PI1, PI2), and the second light source 132 is arranged to be aligned with the first light source 131 in the module circumferential direction (C'). In the first light source 131, in terms of the relationship of the arrangement, as compared with the second light source 132, the amount of light received by the light receiving arrays (PI1, PI2) and the light receiving array (PA) is uniform in the module circumferential direction (C'), and the characteristics on the distribution of the amount of light are satisfactory. Hence, as in the present embodiment, the first light source 131 is used as the main light source, and the second light source 132 is used as the auxiliary light source performing switching as necessary, and thus it is possible to reduce the decrease in the detection accuracy.

In the present embodiment, in particular, the control part 140 determines, based on the incre-signal from the light receiving arrays (PI1, PI2) when the first light source 131 is irradiated, whether or not the irradiation of the first light source 131 is switched to the irradiation of the second light source 132. As a result, when the light receiving signal from the light receiving array (PA) is not the changing point of the bit pattern, and it is not necessary to switch the irradiation of the first light source 131 and the second light source 132, it is possible to perform control such that the light sources are not switched, with the result that it is possible to prevent the unnecessary switching control from being performed and to enhance the reliability. Moreover, since the incre-signal is used to detect the position of the disc 110 highly accurately, and then whether or not the light sources are switched is determined, it is possible to accurately determine whether or not the light receiving signal from the light receiving array (PA) is the changing point of the bit pattern. In the present embodiment, in particular, the light receiving array (PA) is arranged in the position offset to the first light source 131 and the second light source 132 in a direction corresponding to the module radial direction (R'), and the light receiving arrays (PI1, PI2) are arranged on one side and the other side of the first light source 131 and the second light source 132 in the module circumferential direction (C'). As a result, since the arrangement of the light receiving arrays (PI1, PI2, PA) can be made to correspond to the distribution of the amount of light substantially concentric about the first light source 131 and the second light source 132, the area of light received is increased, and it is possible to effectively use the reflected light from the slit arrays (SI, SA). In particular, since the light receiving arrays (PI1, PI2) for incre-signal can be arranged close to the light sources (131, 132), it is possible to reduce the size of the device.

In the present embodiment, in particular, the number of light sources is set at two. As a result, as compared with a case where the number of light sources is set at four, which will be described later, since the number of light sources is decreased, the cost is reduced, and since the number of times the light sources are switched can be minimized, even when the processing speed by the switching control part 141 is low, sufficient performance is obtained.

Variations

The embodiment has been described in detail above with reference to accompanying drawings. However, it is needless to say that the scope of technical ideas is not limited to the embodiment described here. It is clear that a person having ordinary knowledge in the technical field to which the embodiment belongs can perform various modifications and corrections, combinations and the like in the scope of technical ideas recited in the scope of claims. Hence, the technologies of these modifications and corrections, combinations and the like also naturally belong to the scope of technical ideas. Such variations will be sequentially described below. In the following description, the same parts as in the embodiment described above are identified with the same symbols, and their description will be omitted as necessary.

Case where the Incre-Signal is Corrected after Switching of the Light Sources

When in the embodiment described above, the irradiation of the first light source 131 is switched to the irradiation of the second light source 132, after the acquisition of the abso-signal from the light receiving array (PA), the irradiation of the second light source 132 is switched again to the irradiation of the first light source 131 and the incre-signal from the light receiving arrays (PI1, PI2) is acquired. In this case, since the switching of the light sources is performed twice, if the shaft (SH) (the disc 110) is rotated during the switching, a detection error may be made. Hence, in a state where the first light source 131 is switched to the second light source 132, the incre-signal from the light receiving arrays (PI1, PI2) is acquired, and the incre-signal is corrected to the incre-signal by the irradiation of the first light source 131, with the result that the switching of the light sources may be performed once.

Figure 9:
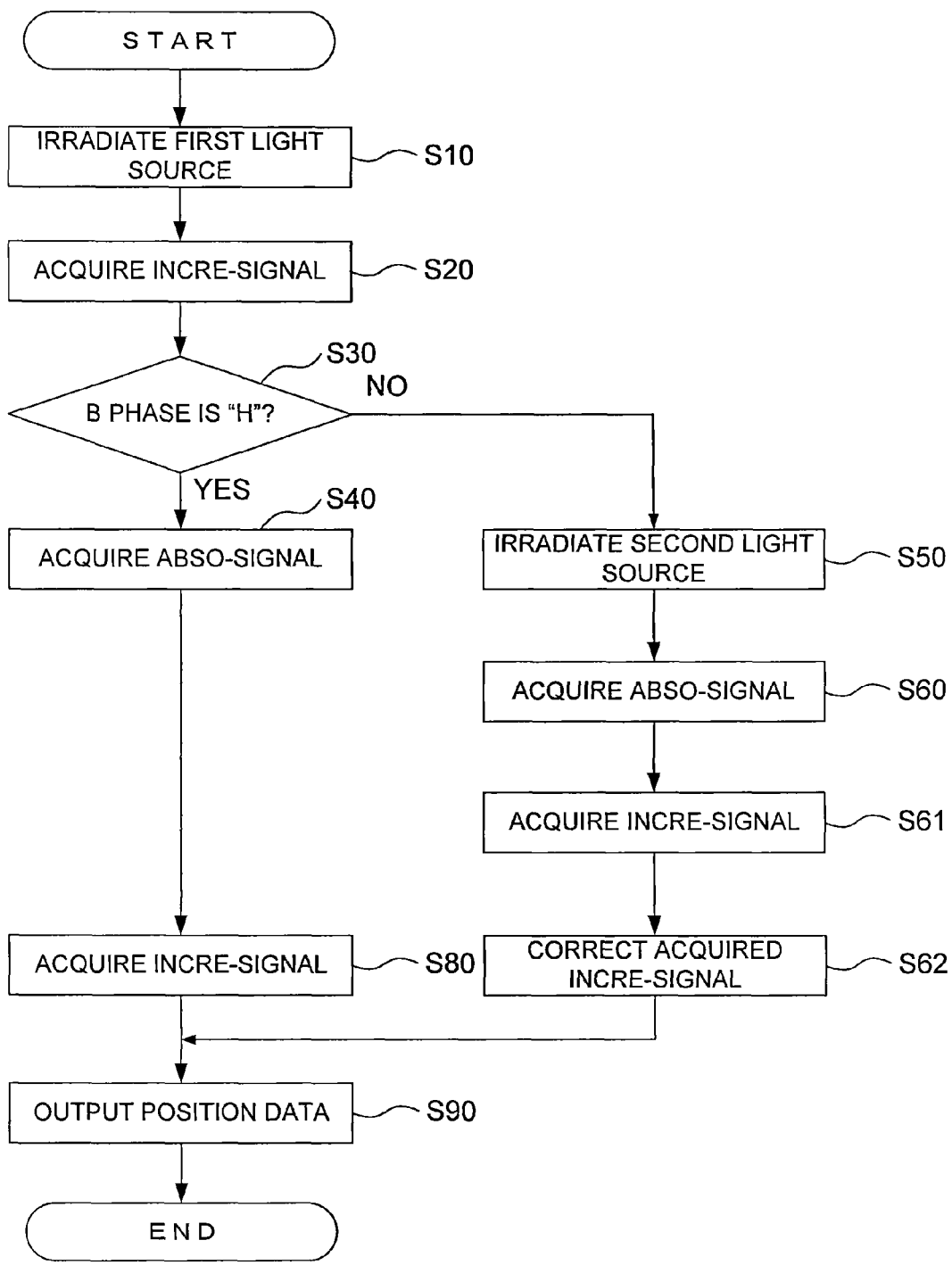
FIG. 9 is an illustrative diagram for illustrating the details of control by a control part according to a variation where an incre-signal is corrected after the switching of light sources.

Details of control by the control part 140 included in the encoder 100 according to the present variation will be described with reference to FIG. 9. The same steps as in FIG. 6 described previously are identified with the same symbols, and their description will be omitted as necessary.

Figure 6:
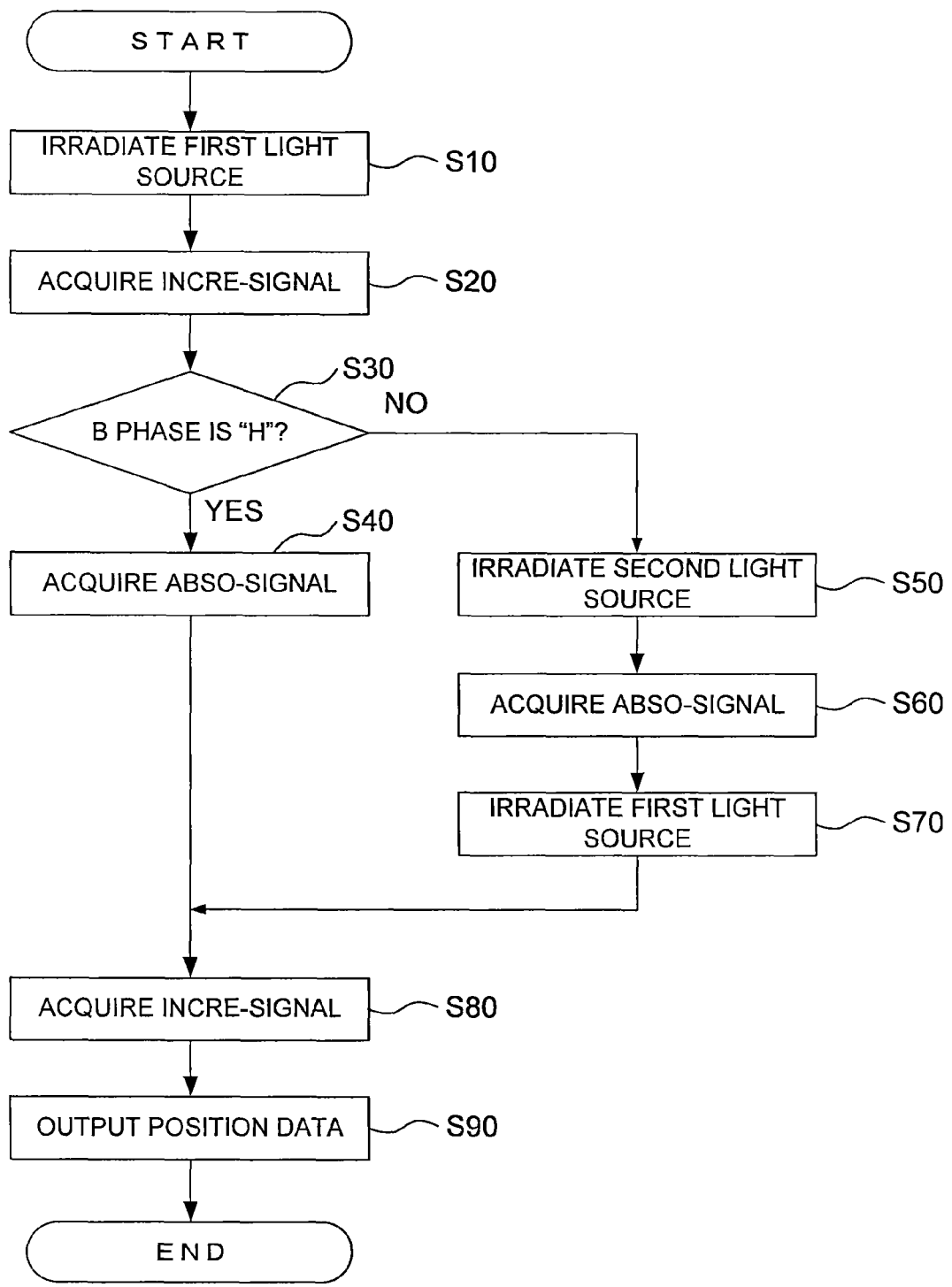
FIG. 6 is an illustrative diagram for illustrating the details of control by a control part according to the embodiment.

Steps S10 to S30 and steps S50 to S60 are the same as in FIG. 6. Specifically, in step S10, the first light source 131 is irradiated, and in step S20, a specific signal (for example, the B phase signal) among the incre-signals is acquired. Then, in step S30, whether or not the acquired signal is "H" is determined, and when it is "L" (NO in step S30), in step S50, the irradiation by the first light source 131 is switched to the irradiation by the second light source 132. Then, in step S60, the abso-signal from the light receiving array (PA) is acquired.

Then, in step S61, the control part 140 acquires, with the position data creation part 142, by irradiation of the second light source 132 the incre-signals (the A phase signal, the B phase signal, the A bar phase signal and the B bar phase signal) from the set of the four light receiving elements included in the light receiving arrays (PI1, PI2) by the irradiation of the second light source 132.

Then, in step S62, the control part 140 corrects, with the position data creation part 142, the incre-signals acquired in step S61 described above to the Mere-signals by the irradiation of the first light source 131. Specifically, since as described above, the two light sources (131, 132) are aligned to be displaced by Pm/2 in the module circumferential direction (C'), the Mere-signal of the light receiving arrays (PI1, PI2) by the first light source 131 and the Mere-signal of the light receiving arrays (PI1, PI2) by the second light source 132 have a phase difference of 180° in electrical angle corresponding to the half pitch of the incremental pattern. Hence, a correction is made such that the phase of each incre-signal by the irradiation of the second light source 132 leads by an electrical angle of 180° (or lags), and thus it is possible to make a correction to be regarded as each incre-signal by the irradiation of the first light source 131.

Thereafter, in step S90, the control part 140 calculates, with the position data creation part 142, based on the abso-signal acquired in step S60 described above and the incre-signals corrected in step S62 described above, the position (x) of the motor (M) indicated by these signals, and outputs position data indicating the position (x) to the controller (CT). Here, the present flow is completed.

In the variation described above, since the number of times the light sources are switched can be changed to one time, it is possible to reduce time necessary for switching the light sources as compared with the embodiment described above. Consequently, it is possible to reduce a detection error produced by the rotation of the shaft (SH) (the disc 110) during the switching of the light sources.

Case where the Lights Sources are Switched when the Signal is "H"

In the embodiment described above, the light sources are switched when a specific signal (for example, the B phase signal) among the incre-signals is "L", and by contrast, it can be considered that the light sources are switched when the signal is "H".

Figure 10:
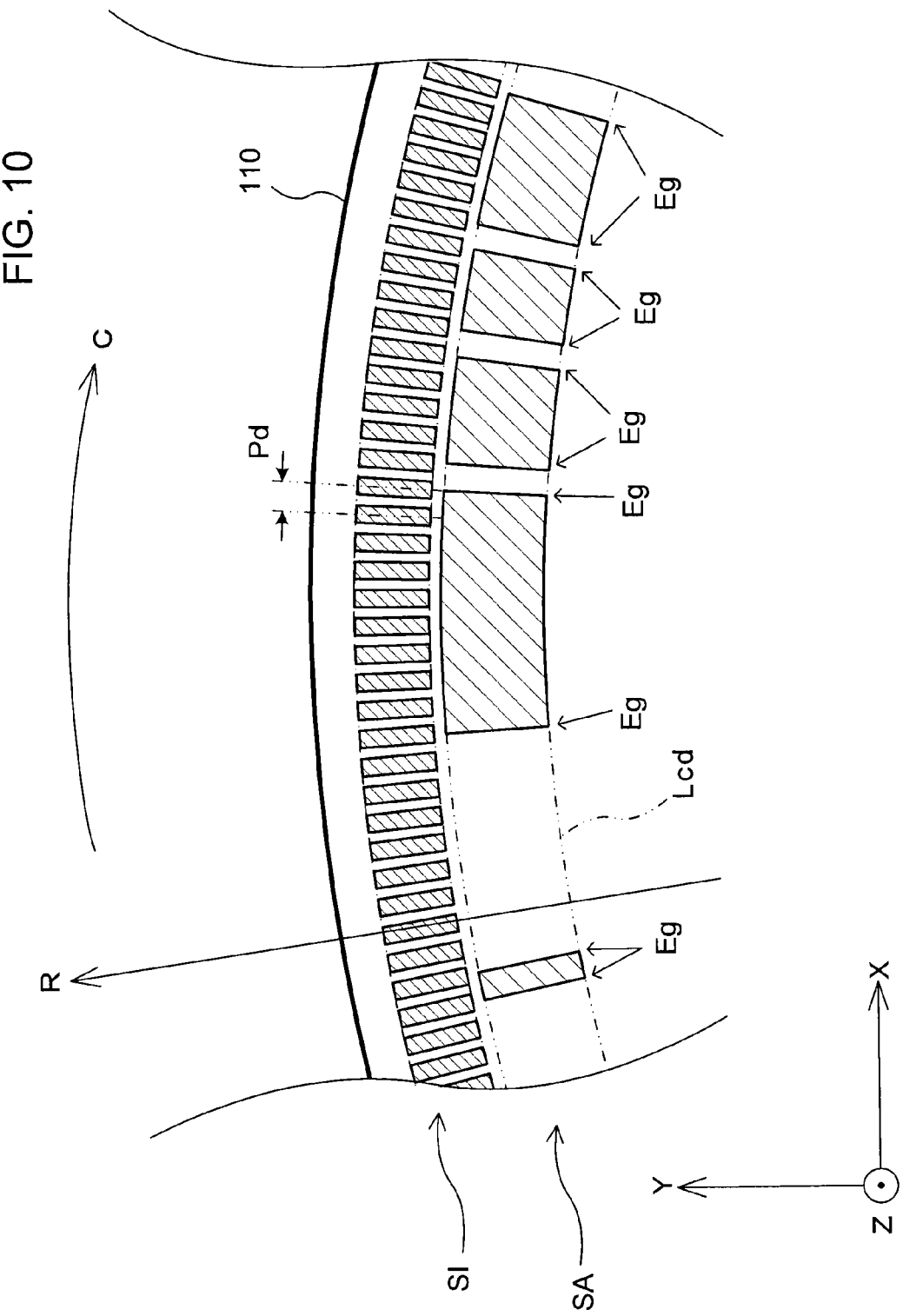
FIG. 10 is an illustrative diagram for illustrating a slit array according to a variation where the light sources are switched when the signal is "H"

In the present variation, for example, as shown in FIG. 10, each reflective slit included in the slit array (SA) is formed such that the end portion (Eg) in the disc circumferential direction (C) is located in the disc circumferential direction (C) in an area where reflective slits included in the slit array (SI) are present. In this case, when the position in one pitch by the incre-signal from the light receiving arrays (PI1, PI2) is the area where the reflective slit is not present, the absolute position by the abso-signal from the light receiving array (PA) does not correspond to the area where the bit pattern is changed. On the other hand, when the position in one pitch is the area where the reflective slit is present, the absolute position by the abso-signal from the light receiving array (PA) may correspond to the area where the bit pattern is changed.

Hence, in the present variation, when the first light source 131 is irradiated, and a specific signal (for example, the B phase signal) acquired from the position data creation part 142 is "H", the switching control part 141 regards the position in one pitch of the disc 110 as the area where the reflective slit of the slit array (SI) is present, determines that the switching of the light sources is needed and switches to the irradiation of the second light source 132. On the other hand, when the specific signal (for example, the B phase signal) acquired from the position data creation part 142 is "L", the switching control part regards the position in one pitch of the disc 110 as the area where the reflective slit of the slit array (SI) is not present, determines that the switching of the light sources is not needed and does not switch the light sources.

In the present variation, the same effects as in the embodiment described above are obtained.

Case where the Light Receiving Arrays for the Incre-Signal are Disposed Together in the Radial Direction of the Light Source Although in the embodiment described above, the case where the light receiving arrays (PI1, PI2) for the incre-signal are arranged on both sides of the light sources 131 and 132 in the module circumferential direction (C') is described, there is no restriction on such an example. For example, the light receiving array (PI) for the incre-signal may be disposed together in the radial direction of the light sources (131, 132). An example thereof will be described below with reference to FIGS. 11 and 12.

Figure 11:
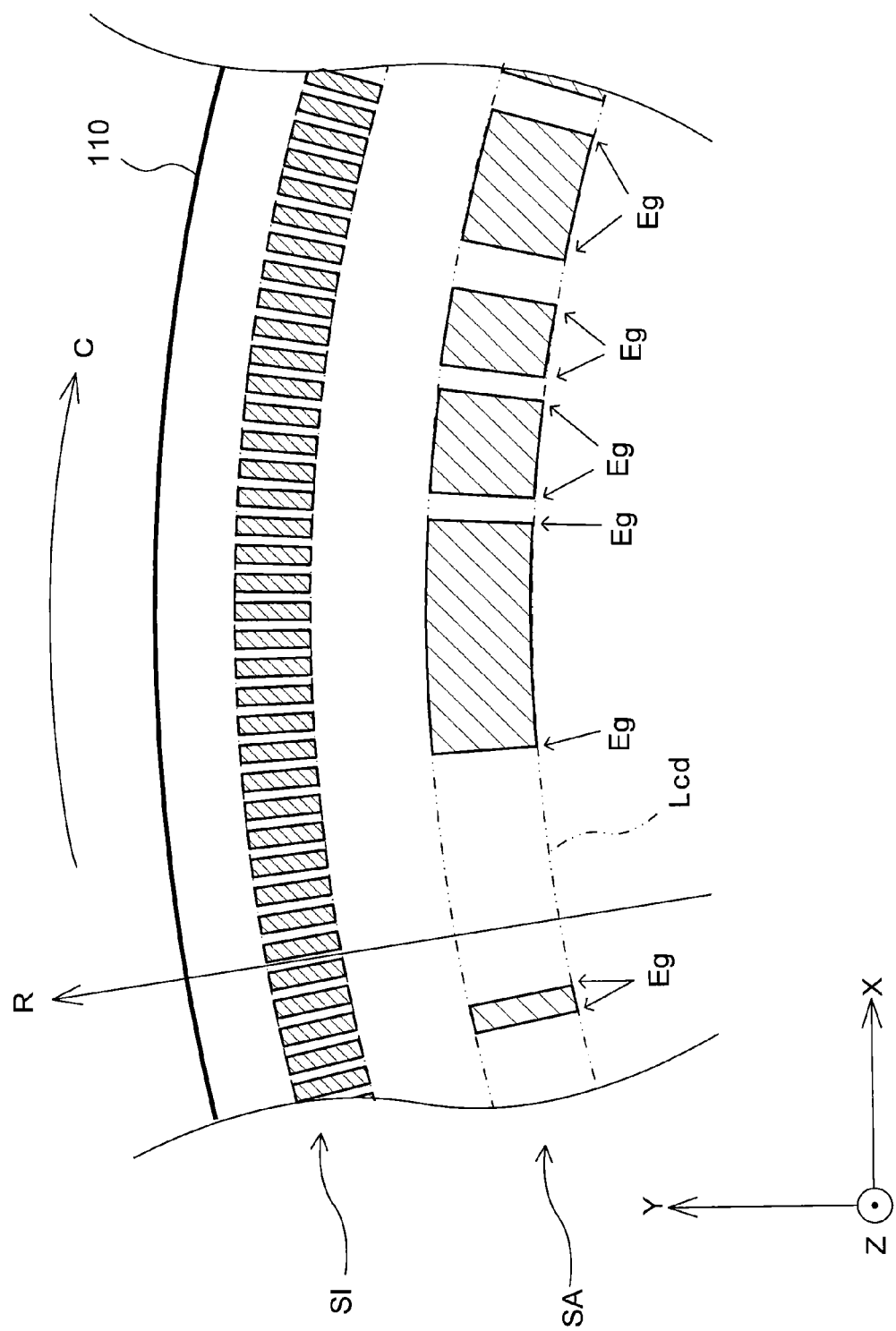
FIG. 11 is an illustrative diagram for illustrating a slit array according to a variation where light receiving arrays for the incre-signal are disposed together in the radial direction of the light sources.

As shown in FIG. 11, the disc 110 of the present variation includes two slit arrays (SA, SI). Multiple reflective slits included in the slit array (SA) have the absolute pattern in the disc circumferential direction (C), and in this example, are arranged on the side of the inside diameter. On the other hand, multiple reflective slits included in the slit array (SI) have the incremental pattern in the disc circumferential direction (C), and in this example, are arranged on the side of the outside diameter. The end portion (Eg) of each reflective slit included in the slit array (SA) is located in the disc circumferential direction (C) in the area (the area between the slits) where multiple reflective slits included in the slit array (SI) are not present, and this point is the same as in the embodiment described above.

Figure 12:
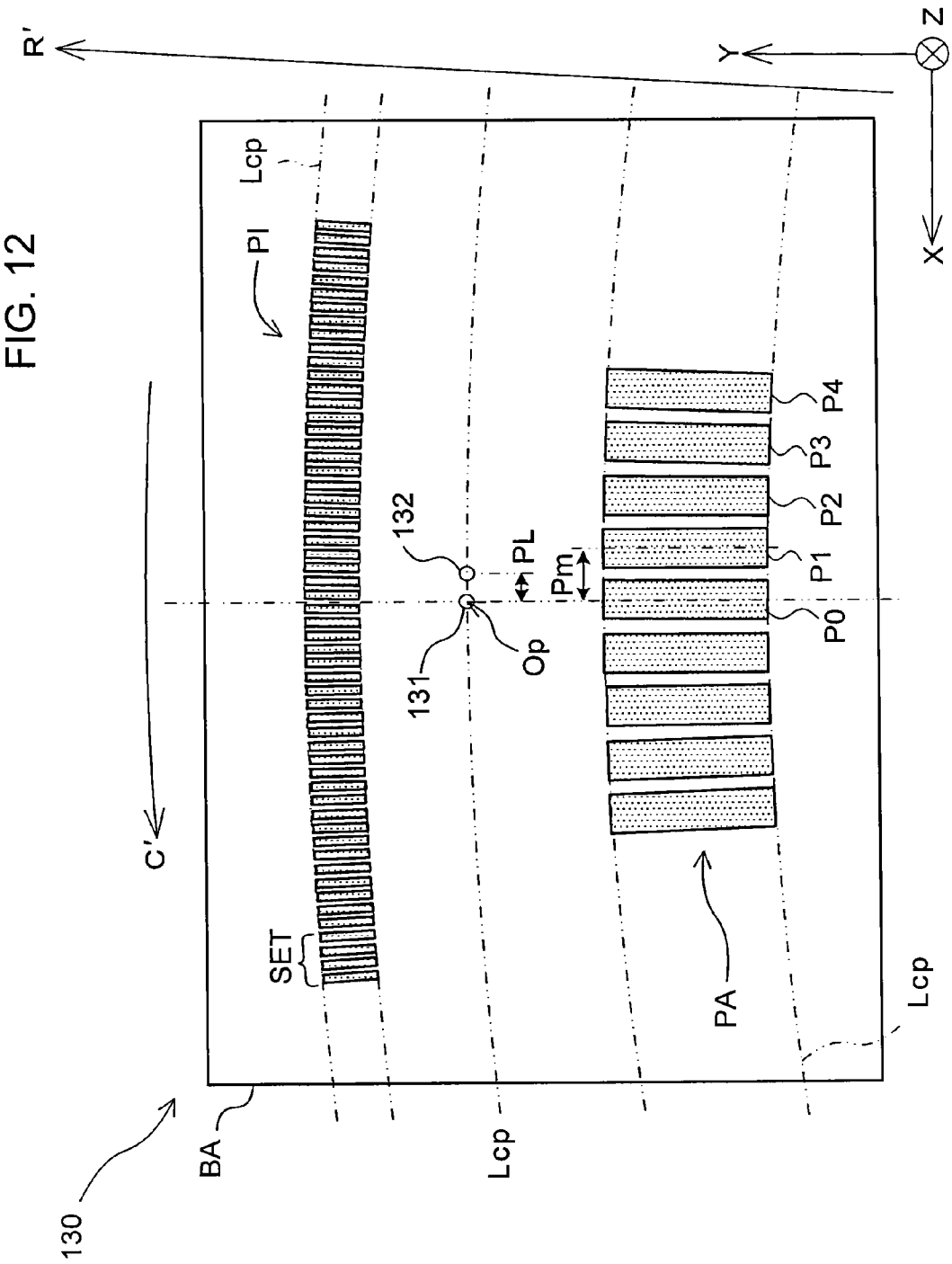
FIG. 12 is an illustrative diagram for illustrating an optical module and a light receiving array according to a variation where light receiving arrays for the incre-signal are disposed together in the radial direction of the light sources.

As shown in FIG. 12, in the optical module 130 of the present variation, the light receiving arrays (PA, PI) are disposed together in the module radial direction (R') of the light sources (131, 132). Specifically, the light receiving arrays (PA, PI) are, within the surface of the substrate (BA) parallel to the slit arrays (SA, SI), arranged in positions offset in directions different from the light sources (131, 132) in the module radial direction (R'). These light receiving arrays (PA, PI) correspond to the two slit arrays (SA, SI), respectively, and the slit array (SA) corresponds to the light receiving array (PA) and the slit array (SI) corresponds to the light receiving array (PI).

The light receiving array (PI) for the incre-signal includes multiple light receiving elements arranged on the line (Lcp) corresponding to the slit array (SI). In the present variation, the light receiving array (PI) is included as one continuous light receiving array, and multiple sets (SETs) of the four light receiving elements described above are aligned along the module circumferential direction (C'). On the other hand, the light receiving array (PA) for the abso-signal includes multiple light receiving elements (in this example, 9 pieces) aligned along the line (Lcp) corresponding to the slit array (SA) with a desired pitch.

The first light source 131 and the second light source 132 are arranged to be displaced by Pm/2 in the module circumferential direction (C'), and this point is the same as in the embodiment described above. The light receiving arrays (PA, PI) link to means for facing a part of the slit array, described in claims.

In the present variation, the same effects as in the embodiment described above are obtained.

Transmission-Type Encoder

Although the case of the so-called reflection-type encoder in which the light receiving arrays (PA, PI1, PI2) are arranged on the same side as the light sources (131, 132) with respect to the slit arrays (SA, SI) of the disc 110 is described above as an example, there is no restriction on this configuration. In other words, a so-called transmission-type encoder may be used in which the light receiving arrays (PA, PI1, PI2) are arranged on the opposite side to the light sources (131, 132) with respect to the slit arrays (SA, SI) of the disc 110. In this case, in the rotation disc 110, the slits of the slit arrays (SA, SI) may be formed as transmission holes or they may be formed by making the parts other than the slits a rough surface or coating them with a low transmittance material. Even when such a transmission-type encoder is used, the same effects as in the embodiment described above are obtained. Although in the present embodiment, the optical module 130 includes the light sources (131, 132) and the light receiving arrays (PA, PI1, PI2), as in the present embodiment, it is not always necessary to form them integrally. Even when the light sources (131, 132) and the light receiving arrays (PA, PI1, PI2) are formed separately such as the case where the encoder is a transmission-type and is arranged to face through the disc 110, both of them are included in the optical module 130.

Case where the Number of Light Sources is Four

Although in the embodiment described above, the case where the number of light sources is two is described as an example, it can be four. The present variation will be described with reference to FIGS. 13 and 14. Since the configuration of the disc 110 in the present variation is the same as that shown in FIG. 4, its description will be omitted.

Figure 13:
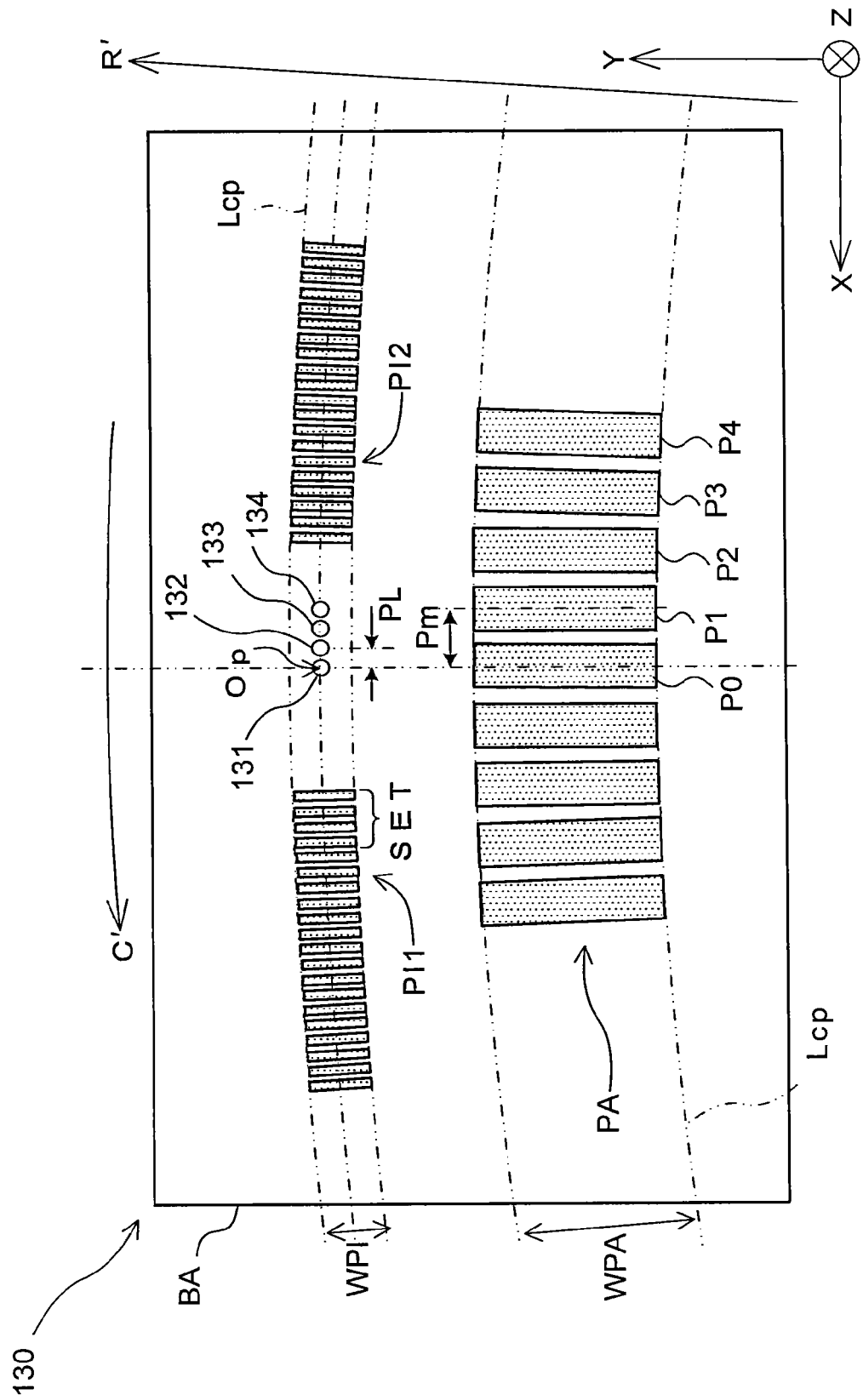
FIG. 13 is an illustrative diagram for illustrating an optical module and a light receiving array according to a variation where the number of light sources is four.

As shown in FIG. 13 the optical module 130 according to the present variation includes four light sources (131, 132, 133, 134) aligned along the module circumferential direction (C'). In the following description, as necessary, as in the embodiment described above, the light source 131 is referred to as the "first light source 131" and the light source 132 is referred to as the "second light source 132", the light source 133 is referred to as a "third light source 133" and the light source 134 is referred to as a "fourth light source 134". The third light source 133 and the fourth light source 134 correspond to an example of another light source.

As in the embodiment described above, the first light source 131 is arranged in a position substantially coinciding with the center position of the light receiving array (PA) in the module circumferential direction (C'). The distance between the light sources (131, 132, 133, 134) is a pitch (PL). When the pitch of the individual light receiving elements in the light receiving array (PA) in the module circumferential direction (C') is assumed to be Pm (which corresponds to an example of the pitch (P)), the pitch (PL) is expressed by the following formula (Formula 3) using the gap length G and the amount of protrusion (Δd) described above.

$$PL=Pm/4\times(G-\Delta d)/G \qquad \text{Formula 3}$$

When the amount of protrusion (Δd) is sufficiently less than the gap length (G), as is understood from the above (Formula 3), the pitch (PL) is substantially equal to a ¼ pitch (Pm/4). For ease of description, a description is given below with assumption that the pitch (PL) is the ¼ pitch (Pm/4) so as to correspond to this case.

Since as described above, the four light sources (131, 132, 133, 134) are aligned to be displaced in the module circumferential direction (C') by the ¼ pitch (Pm/4), it is possible to dispose a phase difference between the abso-signals of the light receiving array (PA) by light from the individual light sources (131, 132, 133, 134). Specifically, the phase difference between the abso-signal by the first light source 131 and the abso-signal by the second light source 132 is a ¼ pitch of the incremental pattern (an electrical angle of 90°), the phase difference between the abso-signal by the first light source 131 and the abso-signal by the third light source 133 is a ½ pitch (an electrical angle of 180°) and the phase difference between the abso-signal by the first light source 131 and the abso-signal by the fourth light source 134 is a ¾ pitch (an electrical angle of 270°).

Then, when the position in one pitch by the incre-signal from the light receiving arrays (PI1, PI2) at the time of the radiation of the first light source 131 corresponds to the area where the reflective slit is not present, the irradiation is switched to the irradiation of the light sources (132, 133, 134) other than the first light source 131. Specifically, the switching control part 141 performs control as follows.

The switching control part 141 first irradiates the first light source 131 at the timing at which the position (x) of the motor (M) is measured (for example, when the power supply of the encoder 100 is turned on). The position data creation part 142 acquires the individual light receiving signals (the A phase signal, the B phase signal, the A bar phase signal and the B bar phase signal) from the sets of the four light receiving elements included in the light receiving arrays (PI1, PI2) at that time. The switching control part 141 acquires, among those light receiving signals, specific signals (for example, the A phase signal and the B phase signal) from the position data creation part 142, and when both the A phase signal and the B phase signal are "H", the position in one pitch of the disc 110 is regarded as the area (here, the substantially center area of the reflective slit) where the reflective slit of the slit array (SI) is present, and it is determined that the light source does not need to be switched. In this case, since the switching control part 141 does not switch the light source, the position data creation part 142 detects the absolute position based on the abso-signal from the light receiving array (PA) by the irradiation of the first light source 131 and likewise detects a relative position from the absolute position based on the incre-signal from the light receiving arrays (PI1, PI2) by the irradiation of the first light source 131.

On the other hand, when at least one of the A phase signal and the B phase signal acquired from the position data creation part 142 at the time of the irradiation of the first light source 131 is "L", the switching control part 141 regards the position in one pitch of the disc 110 as the area (here, including a boundary portion between the area where the reflective slit is present and the area where the reflective slit is not present) where the reflective slit of the slit array (SI) is not present, and determines that the switching of the light sources is needed. In the present variation, when the A phase signal is "L" and the B phase signal is "H", since the phase difference with the above-described case where both the A phase signal and the B phase signal are "H" is a ¼ pitch (an electrical signal of) 90° of the incremental pattern, the switching control part 141 switches the irradiation of the first light source 131 to the irradiation of the second light source 132. When both the A phase signal and the B phase signal are "L", since the phase difference with the above-described case where both the A phase signal and the B phase signal are "H" is a ½ pitch (an electrical signal of 180°), the switching control part 141 switches the irradiation of the first light source 131 to the irradiation of the third light source 133. When the A phase signal is "H" and the B phase signal is "L", since the phase difference with the above-described case where both the A phase signal and the B phase signal are "H" is a ¾ pitch (an electrical signal of 270°), the switching control part 141 switches the irradiation of the first light source 131 to the irradiation of the fourth light source 134. The position data creation part 142 detects the absolute position based on the abso-signal from the light receiving array (PA) at that time. Thereafter, the switching control part 141 switches again to the irradiation of the first light source 131, and the position data creation part 142 detects the relative position from the absolute position based on the incre-signal from the light receiving arrays (PI1, PI2) at that time.

In the present variation, as in the embodiment described above, there is no restriction on the case where the phase difference between the individual abso-signals of the light sources is an electrical angle of 90° corresponding to the ¼ pitch of the incremental pattern. For example, it may be 1.25 pitch (an electrical angle of 112.5°), 2.25 pitch (an electrical angle of 202.5°) or the like. In other words, it can be said that when an natural number including 0 is assumed to be n, the light sources (131, 132, 133, 134) are preferably displaced in the module circumferential direction (C') by (n+0.25) Pm. When it cannot be said that the amount of protrusion (Δd) is sufficiently less than the gap length (G), the four light sources (131, 132, 133, 134) are preferably arranged to be displaced by {(n+0.25) Pm×(G−Δd)/G}.

Figure 14:
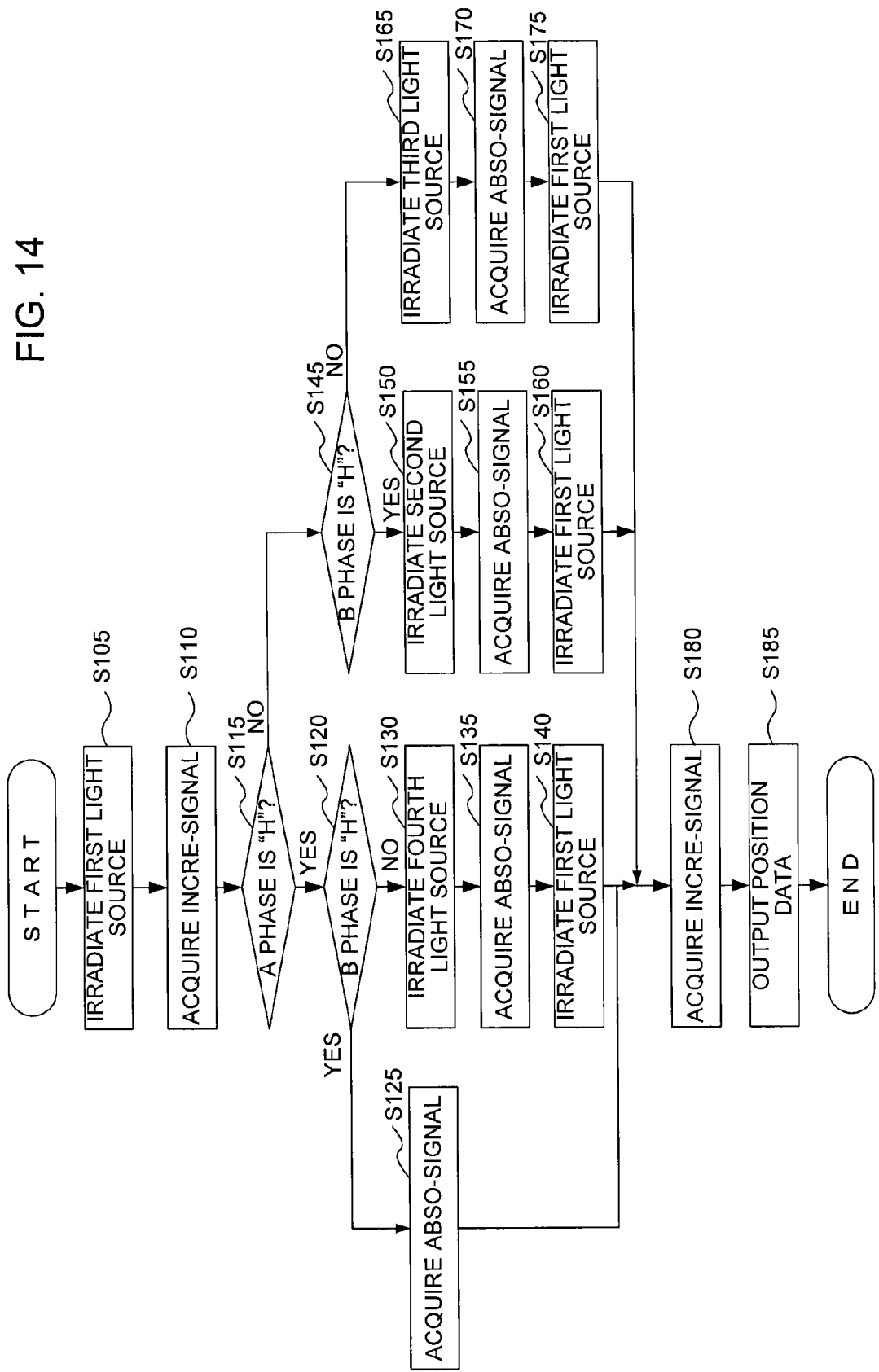
FIG. 14 is an illustrative diagram for illustrating the details of control by a control part according to the variation.

Details of control by the control part 140 included in the encoder 100 according to the present variation will then be described with reference to FIG. 14. The control part 140 starts a step shown in the flowchart of FIG. 14 with timing at which the position (x) of the motor (M) is measured (for example, when the power supply of the encoder 100 is turned on).

Steps S105 and step S110 are the same as steps S10 and S20 shown in FIG. 6 described above. Specifically, the control part 140 feeds, with the switching control part 141, a current to the first light source 131 to irradiate the first light source 131, and acquires, with the position data creation part 142, the individual light receiving signals (the A phase signal, the B phase signal, the A bar phase signal and the B bar phase signal) from the sets of the four light receiving elements included in the light receiving arrays (PI1, PI2). Then, among them, specific signals (for example, the A phase signal and the B phase signal) are acquired.

In step S115, the control part 140 determines, with the switching control part 141, whether or not the A phase signal acquired in step S110 described above is "H". When it is determined that the A phase signal is "H" (YES in step S115), the process proceeds to step S120.

In step S120, the control part 140 determines, with the switching control part 141, whether or not the B phase signal acquired in step S110 described above is "H". When it is determined that the B phase signal is "H" (YES in step S120), the process proceeds to step S125.

In step S125, the control part 140 acquires, with the position data creation part 142, the abso-signal from the light receiving array PA by the irradiation of the first light source 131. Thereafter, the process proceeds to step S180, which will be described later.

On the other hand, when in step S120 described above, it is determined that the B phase signal is "L" (NO in step S120), the process proceeds to step S130.

In step S130, the control part 140 stops, with the switching control part 141, the feed of a current to the first light source 131 to turn it off, and feeds a current to the fourth light source 134 to irradiate the fourth light source 134. As a result, the irradiation by the first light source 131 is switched to the irradiation by the fourth light source 134.

Then, in step S135, the control part 140 acquires, with the position data creation part 142, the abso-signal from the light receiving array (PA) by the irradiation of the fourth light source 134.

Then, in step S140, the control part 140 stops, with the switching control part 141, the feed of a current to the fourth light source 134 to turn it off, and feeds a current to the first light source 131 to irradiate the first light source 131. As a result, the irradiation by the fourth light source 134 is switched again to the irradiation by the first light source 131. Thereafter, the process proceeds to step S180, which will be described later.

On the other hand, when in step S115 described above, it is determined that the A phase signal is "L" (NO in step S115), the process proceeds to step S145.

In step S145, the control part 140 determines, with the switching control part 141, whether or not the B phase signal acquired in step S110 described above is "H". When it is determined that the B phase signal is "H" (YES in step S145), the process proceeds to step S150.

Steps S150 to S160 are the same as steps S130 to steps S140 described above. Specifically, the control part 140 switches, with the switching control part 141, the irradiation by the first light source 131 to the irradiation by the second light source 132, and acquires, with the position data creation part 142, the abso-signal from the light receiving array (PA) by the irradiation of the second light source 132. Thereafter, the irradiation by the second light source 132 is switched again to the irradiation by the first light source 131. Thereafter, the process proceeds to step S180, which will be described later.

On the other hand, when in step S145 described above, it is determined that the B phase signal is "L" (NO in step S145), the process proceeds to step S165.

Steps S165 to S175 are the same as steps S130 to steps S140 described above. Specifically, the control part 140 switches, with the switching control part 141, the irradiation by the first light source 131 to the irradiation by the third light source 133, and acquires, with the position data creation part 142, the abso-signal from the light receiving array (PA) by the irradiation of the third light source 133. Thereafter, the irradiation by the third light source 133 is switched again to the irradiation by the first light source 131.

Then, in step S180, the control part 140 acquires, with the position data creation part 142, the incre-signal from the light receiving arrays (PI1, PI2) by the irradiation of the first light source 131.

In step S185, the control part 140 calculates, with the position data creation part 142, based on the abso-signals acquired in step S125, step S135, step S155 or step S170 and the incre-signal acquired in step S180, the position (x) of the motor (M) indicated by these signals, and outputs the position data indicating the position (x) to the controller (CT). Here, the present flow is completed.

In the variation described above, as compared with the case where the two light sources are used as in the embodiment described above, it is possible to more accurately perform position detection. In other words, while when the two light sources are used, the phase of the abso-signal can be adjusted by the switching of the light sources only every half pitch (an electrical angle of 180°), since in the present variation, the four light sources are used, the phase of the abso-signal can be finely adjusted by the switching of the light sources every ¼ pitch (an electrical angle of 90°). Consequently, for example, even when the phase between the abso-signal and the incre-signal is displaced for any reason, and thus the phase difference between the point where the incre-signal is switched between "H" and "L" and the area where the bit pattern of the abso-signal is changed is decreased, it is possible to calculate the absolute position without using the area where the abso-signal is changed, with the result that it is possible to more enhance the detection accuracy of the absolute position.

Obviously, numerous modifications and variations of the present disclosure are possible in light of the above teachings. It is therefore to be understood that within the scope of the appended claims, the disclosure may be practiced otherwise than as specifically described herein.

What is claimed is:

1. An encoder, comprising:
a disc having at least one slit array comprising a plurality of slits aligned in a circumferential direction of the disc; and
an optical module positioned to face a portion of the slit array such that the slit array moves relative to the optical module in the circumferential direction of the disc,
wherein the optical module includes two or four light sources aligned along a direction corresponding to the circumferential direction and at least one light receiving array that is aligned along the direction corresponding to the circumferential direction and is configured to face a part of the slit array on the same side as the light sources or on an opposite side to the light sources with respect to the slit array, the two or four light sources are positioned to irradiate light upon a portion of the slit array, and the light receiving array includes a plurality of light receiving elements positioned to receive the light irradiated by the light sources and light affected by actions of the slits,
wherein the two or four light sources include a first light source positioned such that a position of the first light source in the direction corresponding to the circumferential direction substantially coincides with a center position of the light receiving array, and a second light source aligned with the first light source in the direction corresponding to the circumferential direction,
wherein the encoder further comprises a control device configured to switch irradiation of the light between the first light source and the second light source, and
wherein the control device determines whether or not the irradiation of the first light source is switched to the irradiation of the second light source based on a light receiving signal from the light receiving array when the first light source irradiates.

2. The encoder according to claim 1, wherein the two or four light sources are positioned such that the light sources are displaced by $\{(n+1/m)\times(G-\Delta d)/G\}$ P with respect to each other in the direction corresponding to the circumferential direction, where P represents a pitch of the light receiving elements in the light receiving array, n represents a natural number including 0, G represents a gap length between the optical module and the disc, $\Delta d$ represents an amount of protrusion of the light sources from a substrate, and m represents 2 or 4.

3. The encoder according to claim 1, wherein the at least one slit array includes a first slit array having an absolute pattern and a second slit array having an incremental pattern, and the at least one light receiving array includes a first light receiving array positioned to receive light from the first slit array and configured to output an absolute signal, and a second light receiving array positioned to receive light from the second slit array and configured to output an incremental signal.

4. The encoder according to claim 3, wherein the control device is configured to control the first light source to irradiate when a power supply of the encoder is turned on and to determine whether or not the irradiation of the first light source is switched to the irradiation of the second light source based on the incremental signal from the second light receiving array at a time when the power supply of the encoder is turned on.

5. The encoder according to claim 4, wherein the control device is configured to detect an absolute position based on the absolute signal from the first light receiving array when the irradiation of the first light source is switched to the irradiation of the second light source, to switch the irradiation of the second light source to the irradiation of the first light source, and to detect a relative position from the absolute position based on the incremental signal from the second light receiving array.

6. The encoder according to claim 4, wherein the control device is configured to detect an absolute position based on the absolute signal from the first light receiving array when the irradiation of the first light source is switched to the irradiation of the second light source, to correct the incremental signal from the second light receiving array by the irradiation of the second light source into the incremental signal from the second light receiving array by the irradiation of the first light source, and to detect the relative position from the absolute position based on a corrected light receiving signal.

7. The encoder according to claim 3, wherein the optical module includes the first light receiving array and the second light receiving array on a same side as the first light source and the second light source with respect to the slit array, the first light receiving array is positioned offset from the first light source and the second light source in a direction corresponding to a radial direction of the disc, and the second light receiving array is positioned on at least one of one side and the other side from the first light source and the second light source in the direction corresponding to the circumferential direction.

8. The encoder according to claim 2, wherein the at least one slit array includes a first slit array having an absolute pattern and a second slit array having an incremental pattern, and the at least one light receiving array includes a first light receiving array positioned to receive light from the first slit array and configured to output an absolute signal, and a second light receiving array positioned to receive light from the second slit array and configured to output an incremental signal.

9. The encoder according to claim 8, wherein the control device is configured to control the first light source to irradiate when a power supply of the encoder is turned on and to determine whether or not the irradiation of the first light source is switched to the irradiation of the second light source based on the incremental signal from the second light receiving array at a time when the power supply of the encoder is turned on.

10. The encoder according to claim 9, wherein the control device is configured to detect an absolute position based on the absolute signal from the first light receiving array when the irradiation of the first light source is switched to the irradiation of the second light source, to switch the irradiation of the second light source to the irradiation of the first light source, and to detect a relative position from the absolute position based on the incremental signal from the second light receiving array.

11. The encoder according to claim 9, wherein the control device is configured to detect an absolute position based on the absolute signal from the first light receiving array when the irradiation of the first light source is switched to the irradiation of the second light source, to correct the incremental signal from the second light receiving array by the irradiation of the second light source into the incremental signal from the second light receiving array by the irradiation of the first light source, and to detect the relative position from the absolute position based on a corrected light receiving signal.

12. The encoder according to claim 4, wherein the optical module includes the first light receiving array and the second light receiving array on a same side as the first light source and the second light source with respect to the slit array, the first light receiving array is positioned offset from the first light source and the second light source in a direction corresponding to a radial direction of the disc, and the second light receiving array is positioned on at least one of one side and the other side from the first light source and the second light source in the direction corresponding to the circumferential direction.

13. The encoder according to claim 5, wherein the optical module includes the first light receiving array and the second light receiving array on a same side as the first light source and the second light source with respect to the slit array, the first light receiving array is positioned offset from the first light source and the second light source in a direction corresponding to a radial direction of the disc, and the second light receiving array is positioned on at least one of one side and the other side from the first light source and the second light source in the direction corresponding to the circumferential direction.

14. The encoder according to claim 6, wherein the optical module includes the first light receiving array and the second light receiving array on a same side as the first light source and the second light source with respect to the slit array, the first light receiving array is positioned offset from the first light source and the second light source in a direction corresponding to a radial direction of the disc, and the second light receiving array is positioned on at least one of one side and the other side from the first light source and the second light source in the direction corresponding to the circumferential direction.

15. An encoder, comprising:
a disc having at least one slit array comprising a plurality of slits aligned in a circumferential direction of the disc; and
an optical module positioned to face a portion of the slit array such that the slit array moves relative to the optical module in the circumferential direction of the disc,
wherein the optical module includes light irradiating means for irradiating light upon a portion of the slit array and light receiving means for receiving the light irradiated by the light sources and light affected by actions of the slits,
wherein the light irradiating means include a first light source positioned such that a position of the first light source in the direction corresponding to the circumferential direction substantially coincides with a center position of the light receiving means, and a second light source aligned with the first light source in the direction corresponding to the circumferential direction,
wherein the encoder further comprises control means for switching irradiation of the light between the first light source and the second light source, and
wherein the control means determines whether or not the irradiation of the first light source is switched to the irradiation of the second light source based on a light receiving signal from the light receiving means when the first light source irradiates.

16. A servomotor, comprising:
a motor having a shaft and configured to rotate the shaft; and
an encoder comprising a disc coupled to the shaft such that the encoder is configured to detect a position of the shaft,
wherein the disc has at least one slit array comprising a plurality of slits aligned in a circumferential direction of the disc,
wherein the encoder includes an optical module positioned to face a portion of the slit array such that the slit array moves relative to the optical module in the circumferential direction of the disc, wherein the optical module includes two or four light sources aligned along a direction corresponding to the circumferential direction and at least one light receiving array that is aligned along the direction corresponding to the circumferential direction and is configured to face a part of the slit array on the same side as the light sources or on an opposite side to the light sources with respect to the slit array, the two or four light sources are positioned to irradiate light upon a portion of the slit array, and the light receiving array includes a plurality of light receiving elements positioned to receive the light irradiated by the light sources and light affected by actions of the slits, wherein the two or four light sources include a first light source positioned such that a position of the first light source in the direction corresponding to the circumferential direction substantially coincides with a center position of the light receiving array, and a second light source aligned with the first light source in the direction corresponding to the circumferential direction, wherein the encoder further comprises a control device configured to switch irradiation of the light between the first light source and the second light source, and wherein the control device determines whether or not the irradiation of the first light source is switched to the irradiation of the second light source based on a light receiving signal from the light receiving array when the first light source irradiates.

\* \* \* \* \*